United States Patent [19]

Kuroda et al.

[11] Patent Number: 5,266,430
[45] Date of Patent: Nov. 30, 1993

[54] PHOTOCONDUCTOR FOR ELECTROPHOTOGRAPHY

[75] Inventors: Masami Kuroda; Masayo Amano; Noboru Furusho, all of Kawasaki, Japan

[73] Assignee: Fuji Electric Co., Ltd., Kawasaki, Japan

[21] Appl. No.: 982,897

[22] Filed: Nov. 30, 1992

Related U.S. Application Data

[62] Division of Ser. No. 799,601, Nov. 27, 1991, Pat. No. 5,198,315, which is a division of Ser. No. 530,088, May 31, 1990, Pat. No. 5,087,541.

[30] Foreign Application Priority Data

Jun. 6, 1989 [JP] Japan .................. 1-143523

[51] Int. Cl.$^5$ .................. G03G 5/47; G03G 5/06
[52] U.S. Cl. ........................... 430/58; 430/59; 430/77; 430/78
[58] Field of Search .................. 430/58, 59, 77, 78

[56] References Cited

U.S. PATENT DOCUMENTS

| | | | |
|---|---|---|---|
| 3,484,237 | 12/1969 | Shattuck et al. | |
| 4,150,987 | 4/1979 | Anderson et al. | 430/59 |
| 4,278,747 | 7/1981 | Murayama et al. | 430/82 |
| 4,353,971 | 10/1982 | Chang et al. | 430/58 |
| 4,367,273 | 1/1983 | Murayama et al. | 430/56 |
| 4,385,106 | 5/1983 | Sakai | 430/59 |
| 4,415,640 | 11/1983 | Goto et al. | 430/59 |
| 4,448,868 | 5/1984 | Suzuki et al. | 430/58 |
| 4,565,761 | 1/1986 | Katagiri et al. | 430/83 |
| 4,568,623 | 2/1986 | Makino et al. | 430/58 |
| 4,606,986 | 8/1986 | Yanus et al. | 430/59 |
| 4,629,670 | 12/1986 | Katagiri et al. | 430/58 |
| 4,666,809 | 5/1987 | Matsumoto et al. | 430/76 |
| 4,673,630 | 6/1987 | Katagiri et al. | 430/72 |
| 4,677,045 | 6/1987 | Champ et al. | 430/76 |
| 4,702,983 | 10/1987 | Kazuhiro et al. | 430/75 |
| 4,731,315 | 3/1988 | Horie et al. | 430/77 |
| 4,783,387 | 11/1988 | Ueda | 430/76 |
| 4,808,503 | 2/1989 | Yamada et al. | 430/75 |
| 4,839,252 | 6/1989 | Murata et al. | 430/59 |
| 4,861,691 | 8/1989 | Kuroda et al. | 430/59 |
| 4,861,692 | 8/1989 | Kuroda et al. | 430/59 |
| 4,865,934 | 9/1989 | Ueda et al. | 430/59 |
| 4,871,636 | 10/1989 | Hattori et al. | 430/77 |
| 4,877,703 | 10/1989 | Kuroda et al. | 430/76 |
| 4,882,255 | 11/1989 | Hattori et al. | 430/73 |
| 4,910,110 | 3/1990 | Kuroda et al. | 430/59 |
| 4,929,525 | 5/1990 | Kuroda et al. | 430/75 |
| 4,935,323 | 6/1990 | Hattori et al. | 430/58 |
| 4,948,689 | 8/1990 | Kuroda et al. | 430/59 |
| 4,950,572 | 8/1990 | Kuroda et al. | 430/59 |
| 4,954,405 | 9/1990 | Sugata et al. | 430/58 |
| 4,956,250 | 9/1990 | Kuroda et al. | 430/58 |
| 4,956,277 | 9/1990 | Kuroda et al. | 430/58 |
| 4,957,837 | 9/1990 | Kuroda et al. | 430/59 |
| 4,971,876 | 11/1990 | Kuroda | 430/75 |

FOREIGN PATENT DOCUMENTS

| | | |
|---|---|---|
| 0131140 | 1/1985 | European Pat. Off. . |
| 182456 | 10/1984 | Japan . |
| 182457 | 10/1984 | Japan . |
| 262052 | 11/1987 | Japan . |
| 131146 | 6/1988 | Japan . |
| 567 | 1/1989 | Japan . |

Primary Examiner—Roland Martin
Attorney, Agent, or Firm—Spencer, Frank & Schneider

[57] ABSTRACT

A photoconductor for electrophotography comprises an electroconductive substrate and a photosensitive layer formed on the substrate. The photosensitive layer includes a novel bisazo compound as a charge generating substance therein. The bisazo compound is represented by the following general formula:

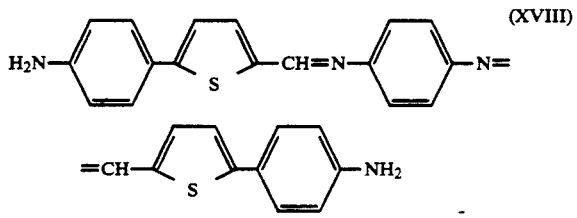

(XVIII)

wherein, A stands for a coupler residue.

3 Claims, 1 Drawing Sheet

PHOTOCONDUCTOR FOR ELECTROPHOTOGRAPHY

This is a division of application Ser. No. 07/799,601 filed Nov. 27th, 1991, now U.S. Pat. No. 5,198,315, which is a division of application Ser. No. 07/530,088 filed May 31st, 1990, now U.S. Pat. No. 5,087,541.

BACKGROUND OF THE INVENTION

1. Field of the Invention

The present invention relates to photoconductors for electrophotography, and particularly to a photoconductor for electrophotography which contains a novel charge generating substance in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photoconductive substances such as poly-N-vinylcarbazole and polyvinylanthracene, organic photoconductive substances such as phthalocyanine compounds and bisazo compounds, dispersions of such organic photoconductive substances in resin binder, and a sputtered film of such organic photoconductive substances.

Photoconductors are required to have a function of maintaining a surface electric charge in the dark, a function of generating an electric charge upon receiving light, and a function of transporting an electric charge upon receiving light. They are classified into two types of photoconductors, namely so-called monolayer type photoconductors, and so-called laminate type photoconductors. The former comprises a single layer having all of the above-mentioned three functions, and the latter comprises functionally distinguishable laminated layers, one of which contributes mainly to the generation of electric charge, and another of which contributes to the retention of surface electric charge in the dark and the electric charge transportation upon receiving light. In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasion), and so on to be ready for reuse.

Photoconductors for electrophotography in which use is made of organic materials have recently been put into practical use by virtue of the advantageous features of flexibility, thermal stability, and/or a film forming capacity. They include a photoconductor comprising poly-N-vinylcarbazole and 2,4,7-trinitrofluoren-9-on (disclosed in U.S. Pat. No. 3,484,237), a photoconductor using an organic pigment as a main component (disclosed in Japanese Patent Laid-Open No. 37,543/1972), and a photoconductor using as a main component a eutectic complex composed of a dye and a resin (disclosed in Japanese Patent Laid-Open No. 10,785/1972). A number of novel hydrazone compounds and bisazo compounds and the like have also been put into practical use for photoconductors.

Although organic materials have many advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity and characteristics in continuous repeated use.

SUMMARY OF THE INVENTION

An object of the present invention, which has been made in view of the foregoing, is to provide a photoconductor for electrophotography for use in copying apparatuses and printers which photoconductor includes a novel organic materials not used to date as a charge generating substance in the photosensitive layer, and has a high photosensitivity and excellent characteristics in repeated use.

In the first aspect of the present invention, a photoconductor for electrophotography comprises:

an electroconductive substrate; and

A photosensitive layer formed on the substrate and including at least one bisazo compound represented by the following general formula (I) as a charge generating substance:

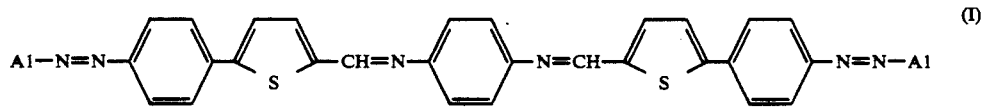

wherein $A_1$ is a coupler residual group represented by one of the following general formulae (IX) to (XI)

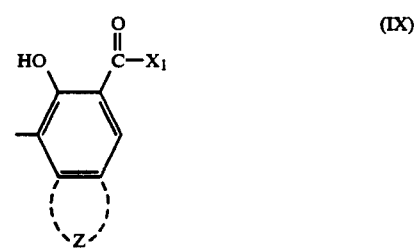

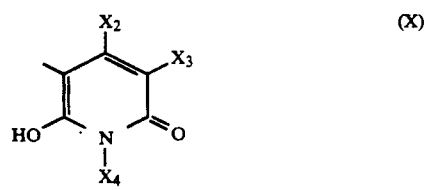

-continued

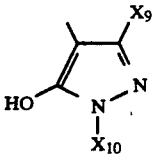
(XI)

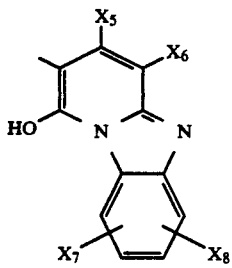
(XII)

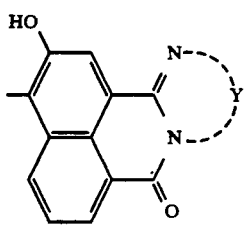
(XIII)

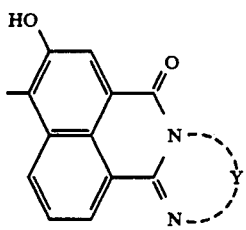
(XIV)

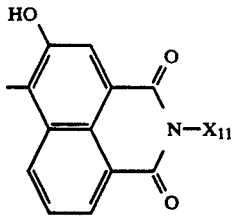
(XV)

wherein Z is a residual group which condenses with a bezen ring to form an aromatic polycycle or heterocycle, $X_1$ is one of $OR_1$ and $NR_2R_3$ (each of $R_1$, $R_2$ and $R_3$ is selected from the group consisting of a hydrogen atom, an alkyl group, an aryl group and a heterocyclic group, which groups may be or not may be substituted), each of $X_2$ and $X_5$ is selected from the group consisting of an alkyl group, an aryl group and a heterocyclic group which groups may be or not may be substituted, each of $X_3$ and $X_6$ is selected from the group consisting of a hydrogen atom, a cyano group, a carbamoyl group, a carboxyl group, an ester group and an acyl group, each of $X_4$ and $X_{11}$ is selected from the group consisting of a hydrogen atom, an alkyl group, a cycloalkyl group, an alkenyl group, an aralkyl group, an aryl group and a heterocyclic group, each of $X_7$ and $X_8$ is selected from the group consisting of a hydrogen atom, a halogen atom, a nitro group, an alkyl group and an alkoxy group, last two of which groups may be or not may be substituted, $X_9$ is selected from the group consisting of an alkyl group, an aryl group, a carboxyl group and an ester group, $Z_{10}$ is one of an aryl group and a heterocyclic group which groups may be or not may be substituted and Y is a residual group which forms an aromatic ring or a heterocycle.

Here, the photosensitive layer may comprise a layer including dispersion of a charge generating substance selected from bisazo compounds represented by the general formula (I) and a charge transporting substance.

The photosensitive layer may comprise a laminate of a charge transporting layer mainly composed of a charge transporting substance and a charge generating layer including a compound selected from bisazo compounds represented by the general formula (I).

In the second aspect of the present invention, a photoconductor for electrophotography comprises:
an electroconductive substrate; and
a photosensitive layer formed on the substrate and including at least one bisazo compound represented by the following general formula (II) as a charge generating substance:

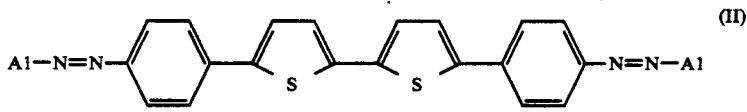
(II)

wherein, $A_1$ is a coupler residual group represented by one of the foregoing general formulae (IX) to (XV).

Here, the photosensitive layer may comprise a layer including dispersion of a charge generating substance selected from bisazo compounds represented by the general formula (II) and a charge transporting substance.

The photosensitive layer may comprise a laminate of a charge transporting layer mainly composed of a charge transporting substance and a charge generating layer including a compound selected from bisazo compounds represented by the general formula (II).

In the third aspect of the present invention, a photoconductor for electrophotography comprises:
an electroconductive substrate; and
a photosensitive layer formed on the substrate and including at least one bisazo compound represented by the following general formula (III) as a charge generating substance:

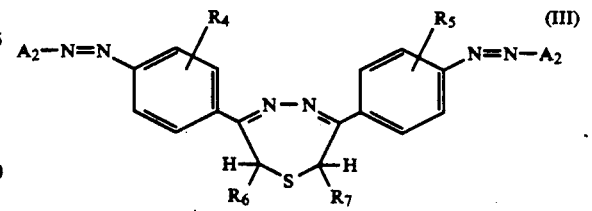
(III)

wherein each of $R_4$ and $R_5$ is selected from the group consisting of a hydrogen atom, a halogen atom, an alkyl group and an alkoxy group, which groups may be or not may be substituted, each of $R_6$ and $R_7$ is selected from the group consisting of a hydrogen atom, an alkyl group and an aryl group, which groups may be or not may be substituted and $A_2$ is a coupler residual group represented by one of the following general formulae (X) to XVII)

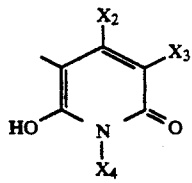
(X)

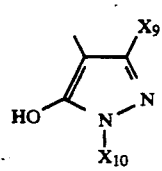
(XI)

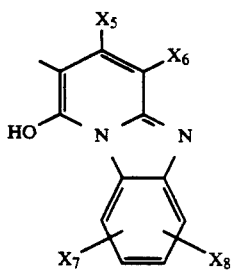
(XII)

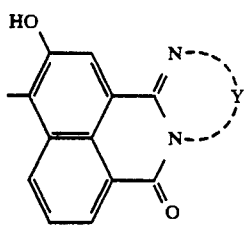
(XIII)

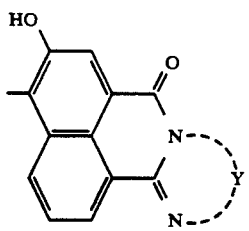
(XIV)

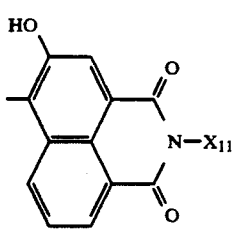
(XV)

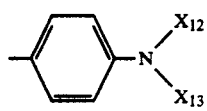
(XVI)

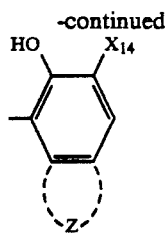
(XVII)

wherein Z is a residual group which condenses with a bezen ring to form an aromatic polycycle or heterocycle, $X_{14}$ is one of a hydrogen atom, $COOR_1$ and $CONR_2R_3$ (each of $R_1$, $R_2$ and $R_3$ is selected from the group consisting of a hydrogen atom, an alkyl group, an aryl group and a heterocyclic group, which groups may be or not may be substituted), each of $X_2$ and $X_5$ is selected from the group consisting of an alkyl group, an aryl group and a heterocyclic group which groups may be or not may be substituted, each of $X_3$ and $X_6$ is selected from the group consisting of a hydrogen atom, a cyano group a carbamoyl group, a carboxyl group, an ester group and an acyl group, each of $X_4$, $X_{11}$, $X_{12}$ and $X_{13}$ is selected from the group consisting of a hydrogen atom, an alkyl group, a cycloalkyl group, an alkenyl group, an aralkyl group, an aryl group and a heterocyclic group, each of $X_7$ and $X_8$ is selected from the group consisting of a hydrogen atom, a halogen atom, a nitro group, an alkyl group and an alkoxy group, last two of which groups may be or not may be substituted, $X_9$ is selected from the group consisting of an alkyl group, an aryl group, a carboxyl group and an ester group, $X_{10}$ is one of an aryl group and a heterocyclic group which groups may or not may be substituted and Y is a residual group which forms an aromatic ring of a heterocycle.

Here, the photosensitive layer may comprise a layer including dispersion of a charge generating substance selected from bisazo compounds represented by the general formula (III) and a charge transporting substance.

The photosensitive layer may comprise a laminate of a charge transporting layer mainly composed of a charge transporting substance and a charge generating layer including a compound selected from bisazo compounds represented by the general formula (III).

In the fourth aspect of the present invention, a photoconductor for electrophotography comprises:

an electroconductive substrate; and a photosensitive layer formed on the substrate and including at least one bisazo compound represented by the following general formula (IV) as a charge generating substance:

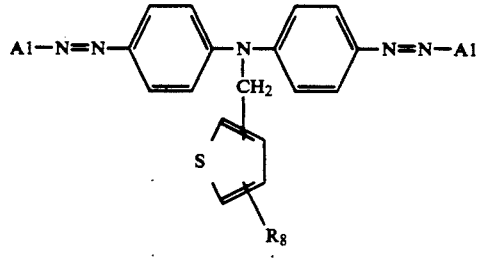
(IV)

wherein $R_8$ is selected from the group consisting of a hydrogen atom, a halogen atom, an alkyl group, an aryl group and a cyano group and $A_1$ is a coupler residual represented by one of the foregoing general formulae (IX) to (XV).

Here, the photosensitive layer may comprise a layer including dispersion of a charge generating substance selected from bisazo compounds represented by the general formula (IV) and a charge transporting substance.

The photosensitive layer may comprise a laminate of a charge transporting layer mainly composed of a charge transporting substance and a charge generating layer including a compound selected from bisazo compounds represented by the general formula (IV).

In the fifth aspect of the present invention, a photoconductor for electrophotography comprises:
an electroconductive substrate; and
a photosensitive layer formed on the substrate and including at least one bisazo compound represented by the following general formula (V) as a charge generating substance:

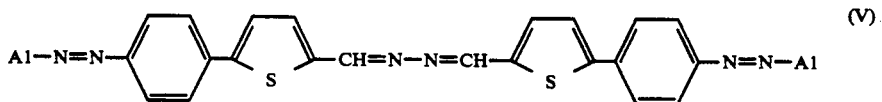

wherein, A is a coupler residual group represented by one of the foregoing general formulae (IX) to (XV).

Here, the photosensitive layer may comprise a layer including dispersion of a charge generating substance selected from bisazo compounds represented by the general formula (V) and a charge transporting substance.

The photosensitive layer may comprise a laminate of a charge transporting layer mainly composed of a charge transporting substance and a charge generating layer including a compound selected from bisazo compounds represented by the general formula (V).

In the sixth aspect of the present invention, a photoconductor for electrophotography comprises:
an electroconductive substrate; and
a photosensitive layer formed on the substrate and including at least one bisazo compound represented by the following general formula (VI) as a charge generating substance:

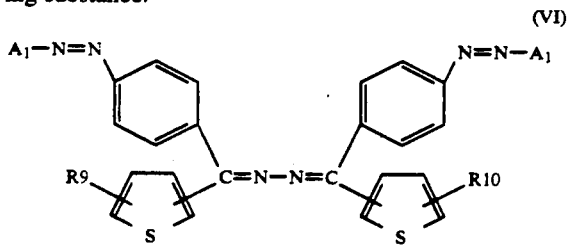

wherein each of the $R_9$ and $R_{10}$ is selected from the group consisting of a hydrogen atom, a halogen atom, an alkyl group and an aryl group and $A_1$ is a coupler residual group represented by one of the foregoing general formulae (IX) to (XV).

Here, the photosensitive layer may comprise a layer including dispersion of a charge generating substance selected from bisazo compounds represented by the general formula (VI) and a charge transporting substance.

The photosensitive layer may comprise a laminate of a charge transporting layer mainly composed of a charge transporting substance and a charge generating layer including a compound selected from bisazo compounds represented by the general formula (VI).

In the seventh aspect of the present invention, a photoconductor for electrophotography comprises:
an electroconductive substrate; and
a photosensitive layer formed on the substrate and including at least one bisazo compound represented by the following general formula (VII) as a charge generating substance:

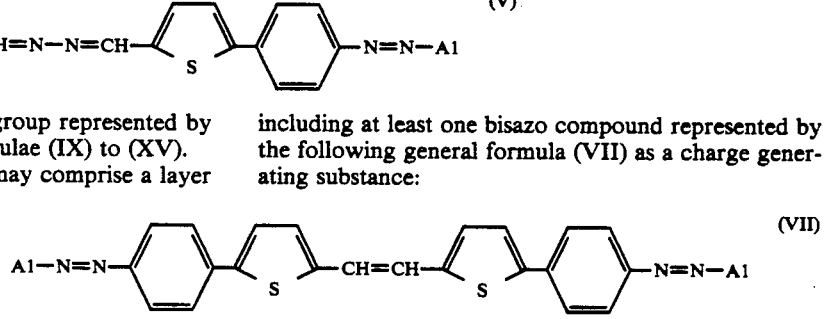

wherein, $A_1$ is a coupler residual group represented by one of the foregoing general formulae (IX) to (XV).

Here, the photosensitive layer may comprise a layer including dispersion of a charge generating substance selected from bisazo compounds represented by the general formula (VII) and a charge transporting substance.

The photosensitive layer may comprise a laminate of a charge transporting layer mainly composed of a charge transporting substance and a charge generating layer including a compound selected from bisazo compounds represented by the general formula (VII).

In the eighth aspect of the present invention, a photoconductor for electrophotography comprises:
an electroconductive substrate; and
a photosensitive layer formed on the substrate and including at least one bisazo compound represented by the following general formula (VIII) as a charge generating substance:

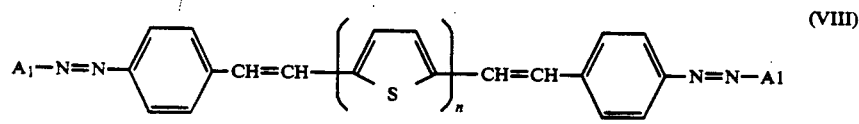

wherein n is one integer of 1 to 3 and $A_1$ is a coupler residual group represented by one of the foregoing formulae (IX) to (XV).

Here, the photosensitive layer may comprises a layer including dispersion of a charge generating substance selected from bisazo compounds represented by the general formula (VIII) and a charge transporting substance.

The photosensitive layer may comprise a laminate of a charge transporting layer mainly composed of a charge transporting substance and a charge generating layer including a compound selected from bisazo compounds represented by the general formula (VIII).

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
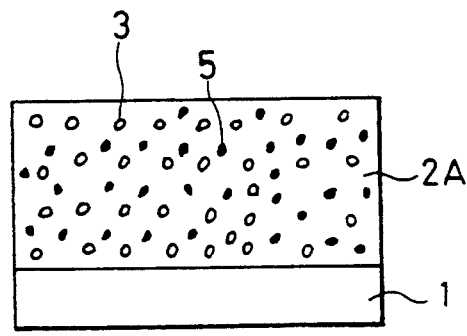
FIGS. 1 to 3 are schematic cross-sectional views of photoconductors according to the present invention.
Figure 2:
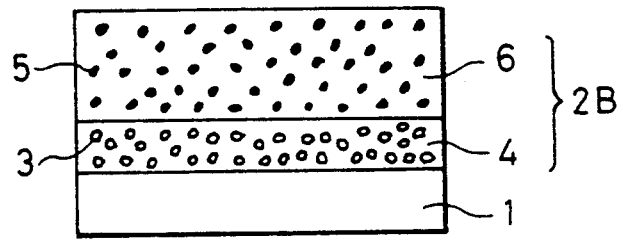
Figure 3:
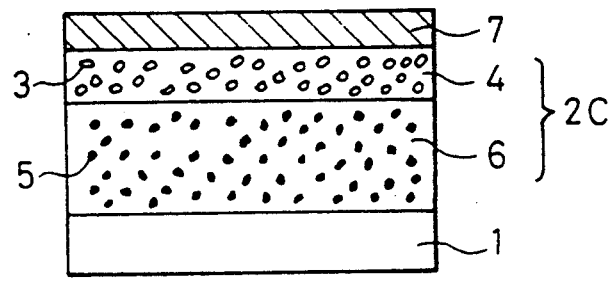

The photoconductor of the present invention, which contains the specific bisazo compound as a charge generating substance in the photosensitive layer thereof, may have any one of the structures as shown in FIGS. 1, 2 and 3 according to the manner of application thereto of the bisazo compound. The specific bisazo compounds to be used in the present invention are explained later.

FIGS. 1, 2 and 3 are schematic cross-sectional views of different embodiments of the photoconductor of the present invention, respectively.

FIG. 1 shows a cross-sectional view of a monolayer type photoconductor. A photosensitive layer 2A is provided on an electroconductive substrate 1. The photosensitive layer 2A comprises the above-mentioned bisazo compound as a charge generating substance 3, and a charge transporting substance 5 both of which substrates are dispersed in a resin binder matrix so that the photosensitive layer 2A functions as a photoconductor.

FIG. 2 shows a laminate type photoconductor. A laminated photosensitive layer 2B is provided on an electroconductive substrate 1, a lower layer of the laminate is a charge generating layer 4 including the above-mentioned bisazo compound as a charge generating substance 3 and an upper one is a charge transporting layer 6 containing a charge transporting substance 5 as a main component, so that the photosensitive layer 2B functions as a photoconductor. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 and an upper one is a charge generating layer 4 including the above-mentioned bisazo compound as a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, two kinds of layer structure are provided for laminate type photoconductors. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 for the present.

A photoconductor as shown in FIG. 1 can be produced by dispersing a charge generating substance in a solution of a charge transporting substance and a resin binder and applying the resulting dispersion on an electroconductive substrate and then drying the resulting coating film.

A photoconductor as shown in FIG. 2 can be prepared by applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder onto an electroconductive substrate, and coating and drying dispersion of a particulate charge generating substance in a solvent and/or a resin binder onto the resulting coating layer, followed by formation of a covering layer.

The electroconductive substrate 1 serves as an electrode of the photoconductor and as a support for a layer or layers formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a bisazo compound as a charge generating substance 3 in a resin binder, and this layer generates an electric charge upon receiving light. It is important that the charge generating layer 4 be high not only in charge generating efficiency but also in capability of injecting the generated electric charge into the charge transporting layer 6 and any covering layer 7, which capability is desirably as little dependent upon the electric field as possible and high even in low intensity electric fields. It also is possible to form a charge generating layer using a charge generating substance as a main component in mixture with a charge transporting substance and so on. Resin binders usable in the charge generating layer include polycarbonates, polyesters, polyamides, polyurethanes, polyvinyl chloride, epoxy resins, silicone resins, diallyl phthalate resins and homopolymers and copolymers of methacrylate esters, which may be used either alone or in appropriate combination.

The charge transporting layer 6, which is formed by application of a solution of dispersion of a hydrazone compound, a pyrazoline compound, a stilbene compound, a triphenyl-amine compound, an oxazole compound or an oxadiazole compound as an organic charge transporting substance in a resin binder, exhibits a function of serving as an insulating layer in the dark to retain an electric charge of the photoconductor as well as a function transporting an electric charge injected from the charge generating layer upon receiving light. Resin binders usable in the charge transporting layer include polycarbonates, polyesters, polyamides, polyurethanes, epoxy resins, silicone resins, and homopolymers and copolymers of methacrylate ester.

The covering layer 7 has a function of receiving and retaining an electric charge generated by corona discharge in the dark and a capability of transmitting light to which the charge generating layer should respond. It is necessary that the covering layer 7 transmits light upon exposure of the photoconductor and allows the light to reach the charge generating layer, and then undergoes the injection of an electric charge generated in the charge generating layer to neutralize and erases a surface electric charge. Materials usable in the covering layer include organic insulating film-forming materials such as polyesters and polyamides. Such organic materials may also be used in mixture with an inorganic material such as a glass resin or $SiO_2$, or an electric resistance-lowering material such as a metal or a metallic oxide. Materials usable in the covering layer are not limited to organic insulating film-forming materials, and further include inorganic materials such as $SiO_2$, metals, and metallic oxides, which may be formed on a covering layer by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

Now, the bisazo compounds to be used as a charge generating substance in the present invention will be explained. The first kind of the specific bisazo compounds are represented by the following general formula (I):

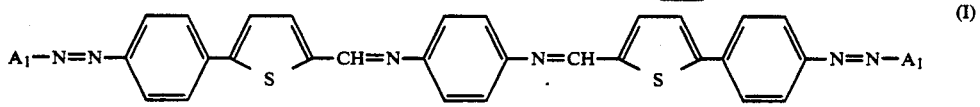

(I)

wherein, $A_1$ is a coupler residual group represented by one of the following general formulae (IX) to (XV)

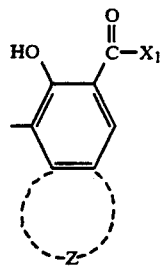

(IX)

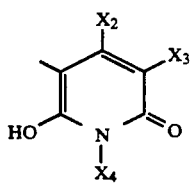

(X)

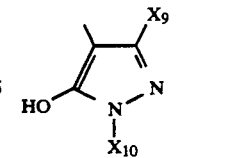

(XI)

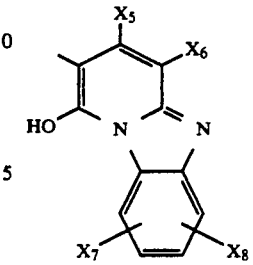

(XII)

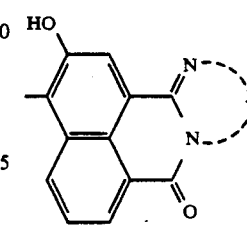

(XIII)

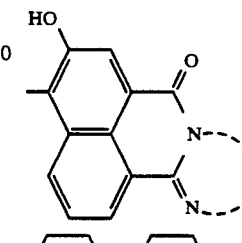

(XIV)

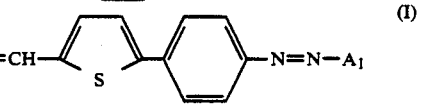

(XV)

wherein Z is a residual group which condenses with a bezen ring to form an aromatic polycycle or heterocycle, $X_1$ is one of $OR_1$ and $NR_2R_3$ (each of $R_1$, $R_2$ and $R_3$ is selected from the group consisting of a hydrogen atom, an alkyl group, an aryl group and a heterocyclic group, which groups may be or not may be substituted), each of $X_2$ and $X_5$ is selected from the group consisting of an alkyl group, an aryl group and a heterocyclic group which groups may be or not may be substituted, each of $X_3$ and $X_6$ is selected from the group consisting of a hydrogen atom, a cyano group, a carbamoyl group, a carboxyl group, an ester group and an acyl group, each of $X_4$ and $X_{11}$ is selected from the group consisting of a hydrogen atom, an alkyl group, a cycloalkyl group, an alkenyl group, an aralkyl group, an aryl group and a heterocyclic group, each of $X_7$ and $X_8$ is selected from the group consisting of a hydrogen atom, a halogen atom, a nitro group, an alkyl group and an alkoxy group, last two of which groups may be or not may be substituted, $X_9$ is selected from the group consisting of an alkyl group, an aryl group, a carboxyl group and an ester group, $X_{10}$ is one of an aryl group and a heterocyclic group which groups may be or not may be substituted and Y is a residual group which forms an aromatic ring or a heterocycle.

The second kind of the specific bisazo compounds are represented by the following general formula (II):

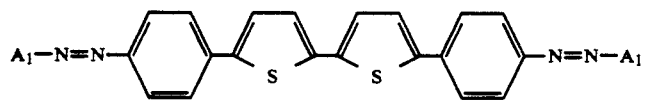

wherein, $A_1$ is a coupler residual group described above.

The third kind of the specific bisazo compounds are represented by the following general formula (III):

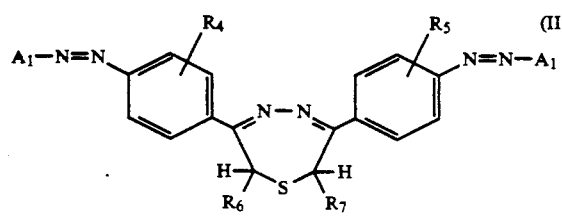

wherein, each of $R_4$ and $R_5$ is selected from the group consisting of a hydrogen atom, a halogen atom, an alkyl group and an alkoxy group, which groups may be or not may be substituted, each of $R_6$ and $R_7$ is selected from the group consisting of a hydrogen atom, an alkyl group and an aryl group, which groups may be or not may be substituted, $A_2$ is a coupler residual group represented by one of the above-described general formulae (X) to (XV) and the following general formulae (XVI) to (XVII):

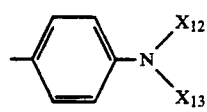

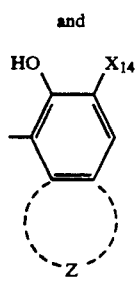

wherein, Z is exactly the same as defined relating to the general formula (IX) and each of $X_{12}$ and $X_{13}$ is selected from the group consisting of a hydrogen atom, an alkyl group, a cycloalkyl group, an alkenyl group, an aralkyl group, an aryl group and a heterocyclic group and $X_{14}$ is one of a hydrogen atom, $COOR_1$ and $COR_2R_3$.

The fourth kind of the specific bisazo compounds are represented by the following general formula (IV):

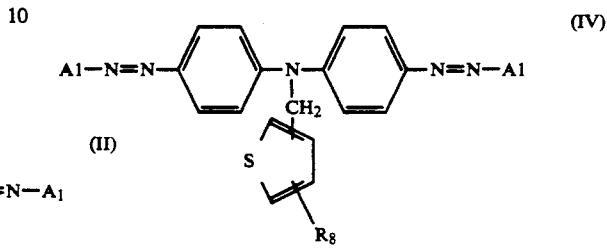

wherein $R_8$ is selected from the group consisting of a hydrogen atom, a halogen atom, an alkyl group, an aryl group and a cyano group and $A_1$ is an aforementioned coupler residual group.

The fifth kind of the specific bisazo compounds are represented by the following general formula (V):

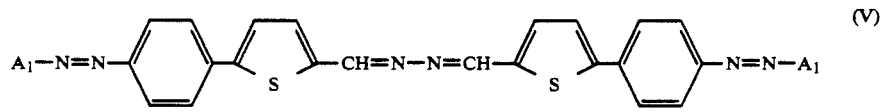

wherein, $A_1$ is a coupler residual group described before.

The sixth kind of the specific bisazo compounds are represented by the following general formula (VI):

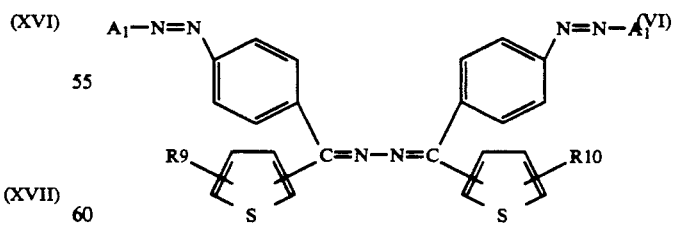

wherein each of $R_9$ and $R_{10}$ is selected from the group consisting of a hydrogen atom, a halogen atom, an alkyl group and an aryl group and $A_1$ is a coupler residual group described before.

The seventh kind of the specific bisazo compounds are represented by the following general formula (VII):

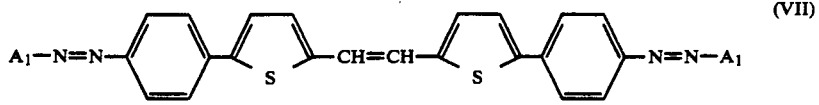
(VII)

wherein, $A_1$ is a coupler residual represented by the general formulae (IX) to (XV).

The eighth kind of the specific bisazo compounds to be used as a charge generating substance in the present invention are represented by the following formula (VIII):

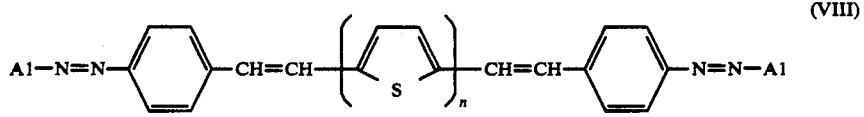
(VIII)

wherein, n is an integer of 1 to 3 and $A_1$ is a coupler residual group represented by one of the general formulae (IX) to (XV) as described before.

Bisazo compounds, represented by the foregoing general formula (I) can be synthesized by diazotizing an amino compound represented by the following general formula (XVIII) with a conventional method and coupling reacting obtained diazo compound with a corresponding coupler in an appropriate solvent (for example, N,N-dimethylformamide, dimethyl sulfoxide and son on) under the presence of a base.

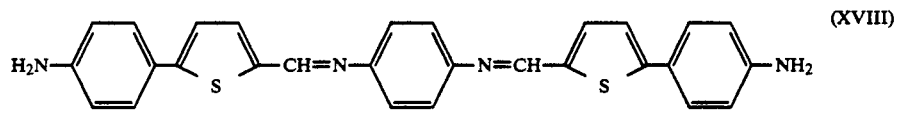
(XVIII)

Specific examples of the bisazo compounds of the general formula (I) prepared in the above-mentioned manner include compounds as shown in Table A.

TABLE A

| COMPOUND No. | $A_1$ |
|---|---|
| 1 | (phenyl-NHCO, naphthalene-OH structure) |
| 2 | ($O_2N$-phenyl-NHCO, naphthalene-OH structure) |

TABLE A-continued
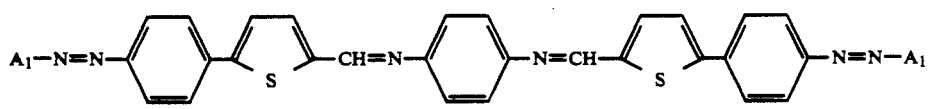
| COMPOUND No. | $A_1$ |
|---|---|
| 3 | 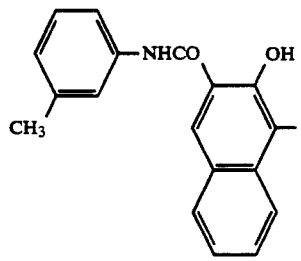 |
| 4 | 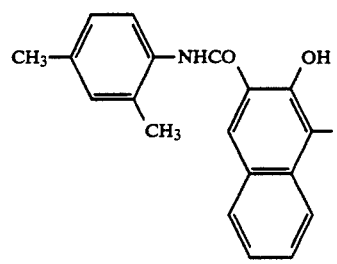 |
| 5 | 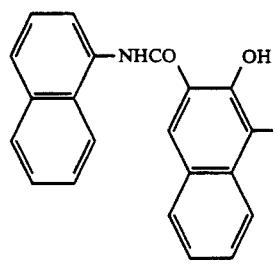 |
| 6 | 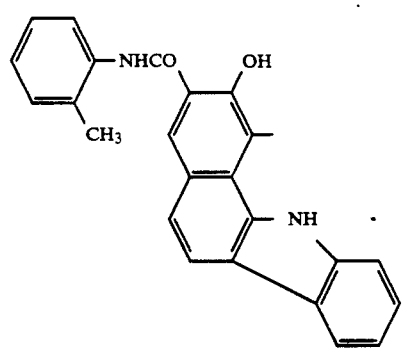 |
| 7 | 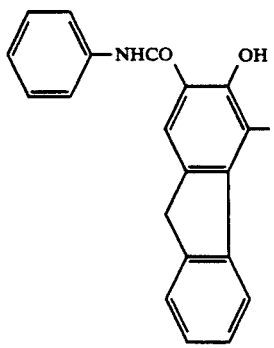 |

TABLE A-continued
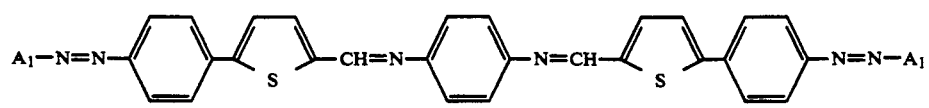
| COMPOUND No. | $A_1$ |
|---|---|
| 8 | 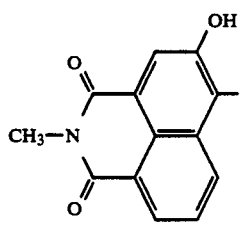 |
| 9 | 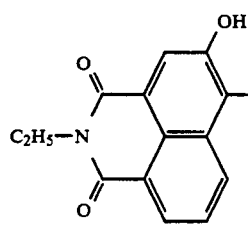 |
| 10 | 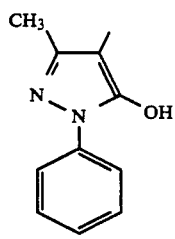 |
| 11 | 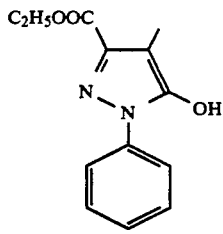 |
| 12 | 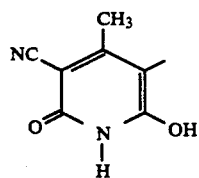 |
| 13 | 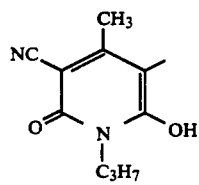 |

TABLE A-continued
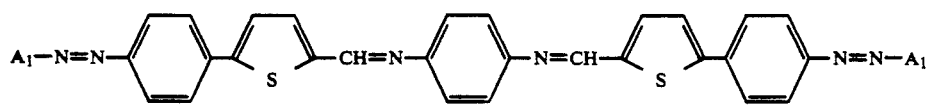
| COMPOUND No. | $A_1$ |
|---|---|
| 14 | 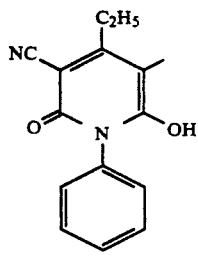 |
| 15 | 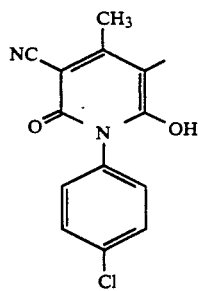 |
| 16 | 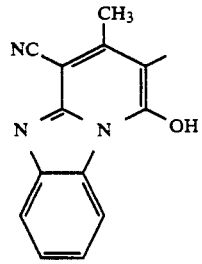 |
| 17 | 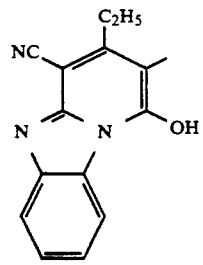 |
| 18 | 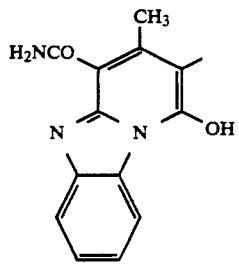 |

TABLE A-continued

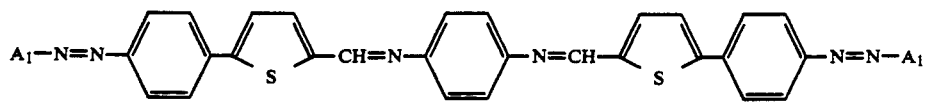

| COMPOUND No. | $A_1$ |
|---|---|
| 19 | 3-methyl-1-(3-chlorophenyl)-5-hydroxy-pyrazole group |
| 20 | 3-(3-bromophenylcarbamoyl)-2-hydroxy-4-methyl-naphthalene group |
| 21 | 3-cyano-4-ethyl-5-methyl-6-hydroxy-1-butyl-2-oxo-pyridine group |
| 22 | benzimidazole-fused hydroxynaphthalimide group (two tautomers) |

Bisazo compounds, represented by the foregoing general formula (II) can be synthesized by diazotizing an amino compound represented by the following general formula (XIX) with a conventional method and coupling reacting obtained diazo compound with a corresponding coupler in an appropriate solvent (for example, N,N-dimethylformamide, dimethyl sulfoxide and so on) under the presence of a base.

(XIX)

Specific examples of the bisazo compounds of the general formula (II) prepared in the above-mentioned manner include compounds as shown in Table B

TABLE B
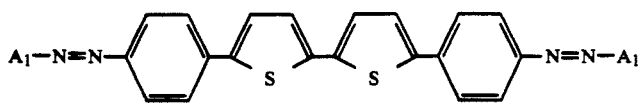
| COMPOUND No. | $A_1$ |
|---|---|
| 31 | 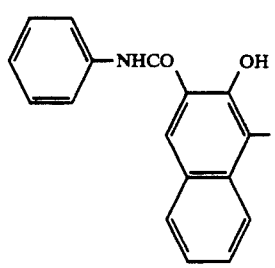 |
| 32 | 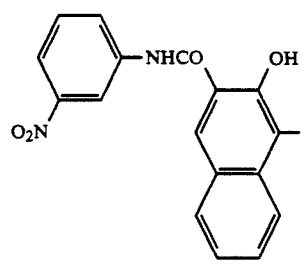 |
| 33 | 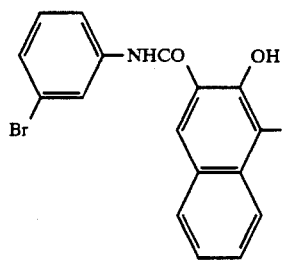 |
| 34 | 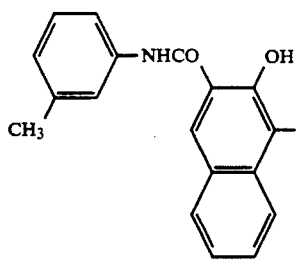 |
| 35 | 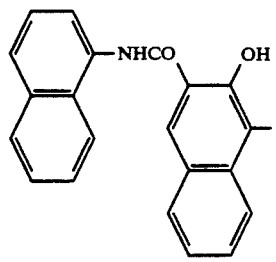 |

TABLE B-continued
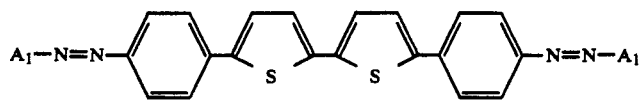
| COMPOUND No. | $A_1$ |
|---|---|
| 36 | 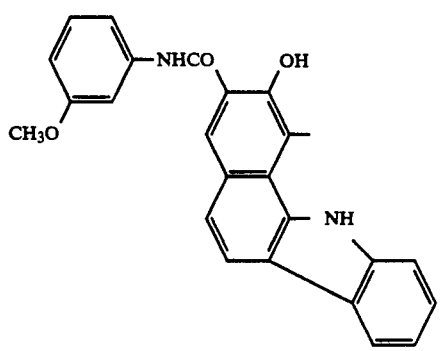 |
| 37 | 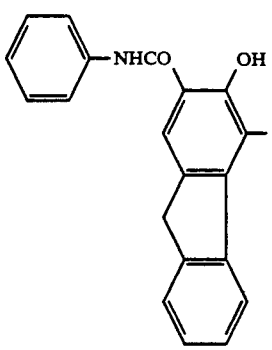 |
| 38 | 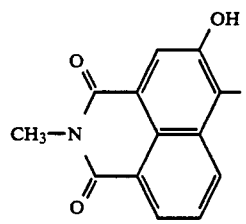 |
| 39 | 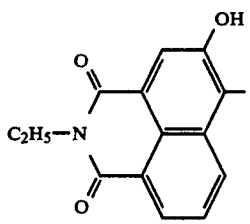 |
| 40 | 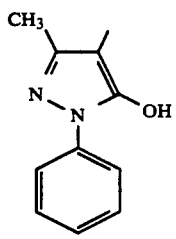 |

TABLE B-continued
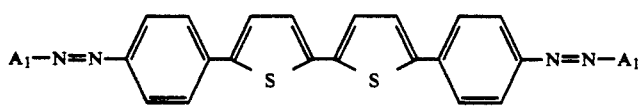
| COMPOUND No. | $A_1$ |
|---|---|
| 41 | 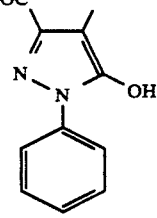 |
| 42 | 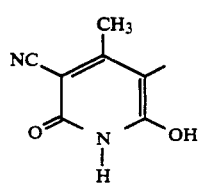 |
| 43 | 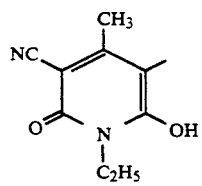 |
| 44 | 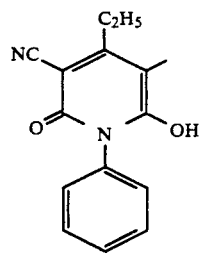 |
| 45 | 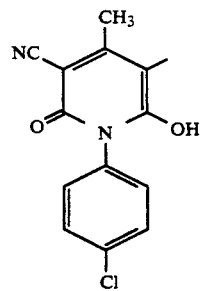 |
| 46 | 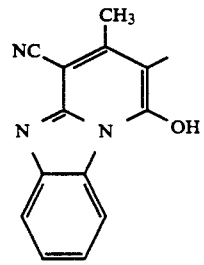 |

TABLE B-continued
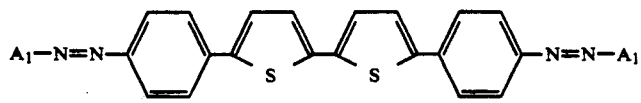
| COMPOUND No. | A₁ |
|---|---|
| 47 | 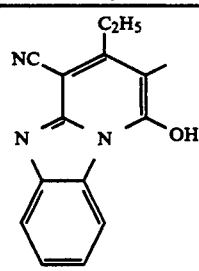 |
| 48 | 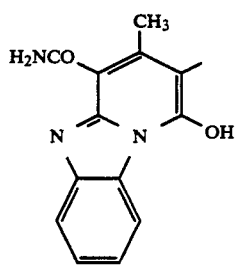 |
| 49 | 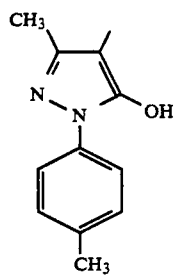 |
| 50 | 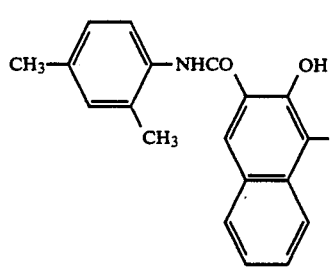 |
| 51 | 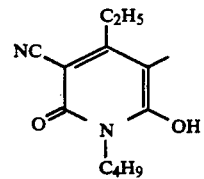 |
| 52 | 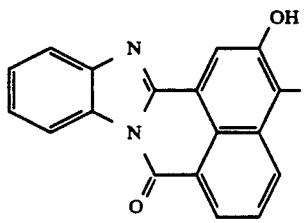 |

TABLE B-continued

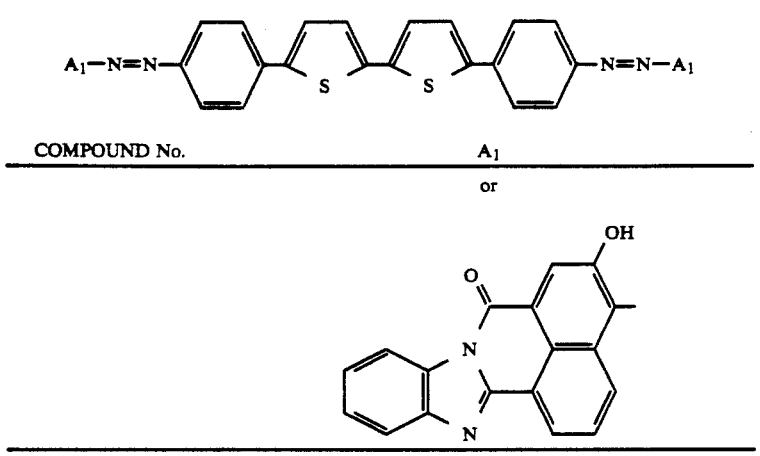

| COMPOUND No. | $A_1$ |
|---|---|
| | or |

Bisazo compounds, represented by the foregoing general formula (III) can be synthesized by diazotizing an amino compound represented by the following general formula (XX) with a conventional method and coupling reacting obtained diazo compound with a corresponding coupler in an appropriate solvent (for example, N,N-dimethylformamide, dimethyl sulfoxide and so on) under the presence of a base.

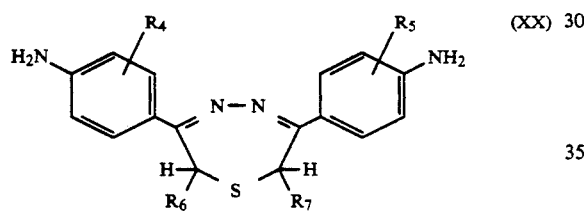
(XX)

Specific examples of the bisazo compounds of the general formula (III) prepared in the above-mentioned manner include compounds as shown in Tables C to I.

TABLE C

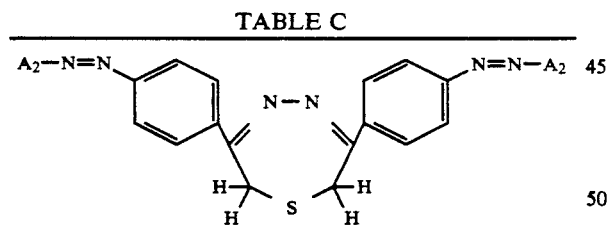

| COMPOUND No. | $A_2$ |
|---|---|
| 61 | 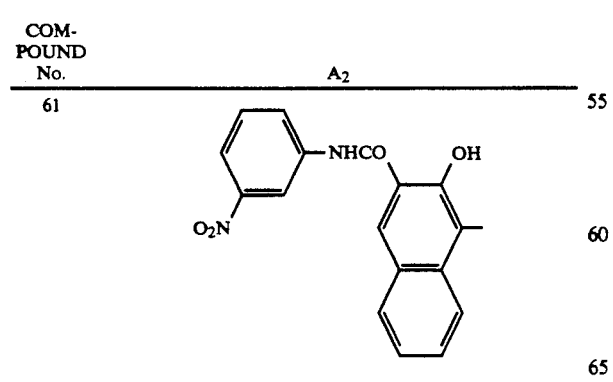 |

TABLE C-continued

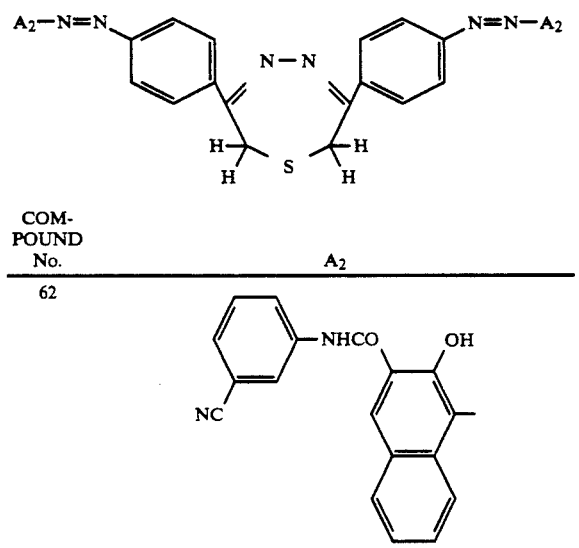

| COMPOUND No. | $A_2$ |
|---|---|
| 62 | |
| 63 | |
| 64 | 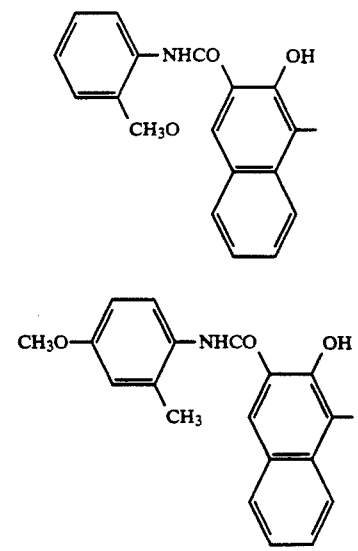 |

TABLE C-continued

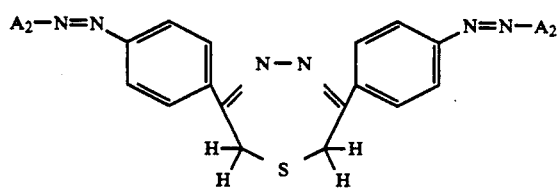

| COMPOUND No. | A₂ |
|---|---|
| 65 | (2-methoxy-anilide of hydroxy-methyl-carbazole-naphthol) |
| 66 | (3-cyano-anilide of hydroxy-methyl-carbazole-naphthol) |
| 67 | 3-cyano-4,5-dimethyl-6-hydroxy-2-pyridone (NH) |
| 68 | 3-cyano-4,5-dimethyl-6-hydroxy-1-ethyl-2-pyridone |
| 69 | 3-carbamoyl-4,5-dimethyl-6-hydroxy-2-pyridone (NH) |

TABLE C-continued

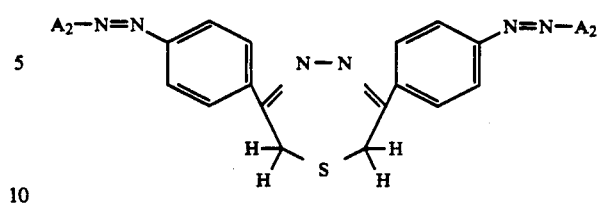

| COMPOUND No. | A₂ |
|---|---|
| 70 | 3-carbamoyl-4,5-dimethyl-6-hydroxy-1-phenyl-2-pyridone |
| 71 | 3-cyano-4,5-dimethyl-6-hydroxy-pyrido-benzimidazolone |
| 72 | 3-carbamoyl-4-methyl-5-ethyl-6-hydroxy-chlorobenzimidazo-pyridone |
| 73 | (benzimidazole-naphthalimide, two isomers) or (benzimidazole-naphthalimide, two isomers) |

TABLE C-continued
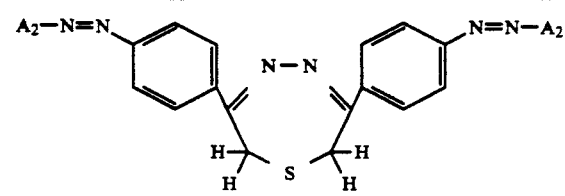
| COMPOUND No. | $A_2$ |
|---|---|
| 74 | 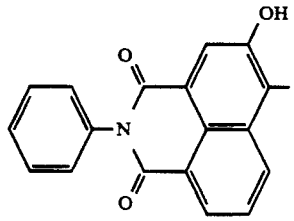 |
| 75 | 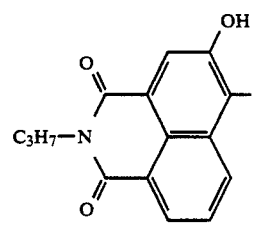 |
| 76 | 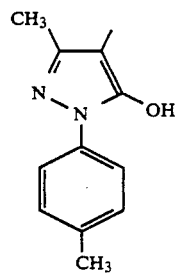 |
| 77 | 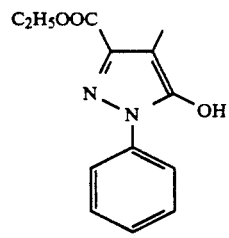 |
| 78 | 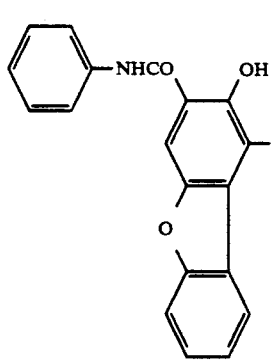 |
TABLE D
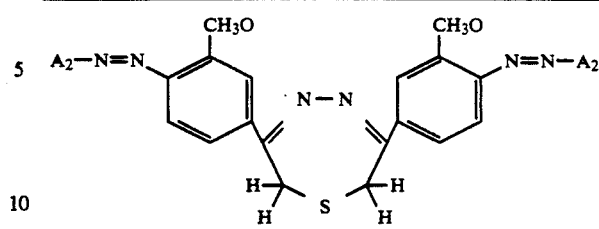
| COMPOUND No. | $A_2$ |
|---|---|
| 79 | 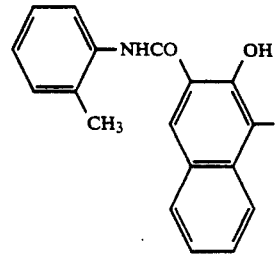 |
| 80 | 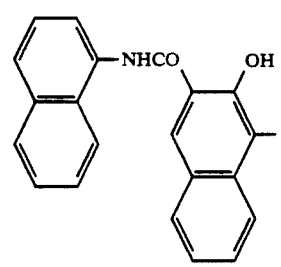 |
| 81 | 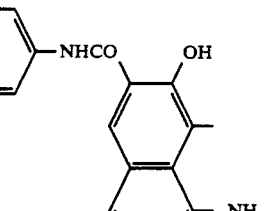 |
| 82 | 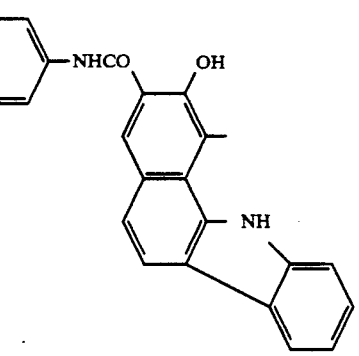 |

TABLE D-continued
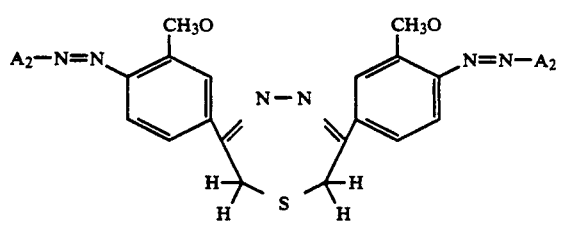
| COMPOUND No. | $A_2$ |
|---|---|
| 83 | 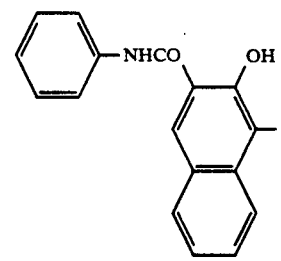 |
| 84 | 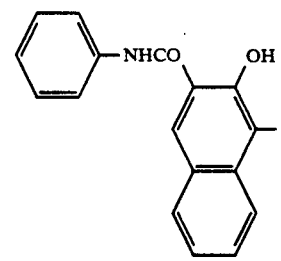 |
| 85 | 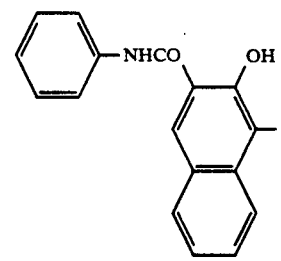 |
| 86 | 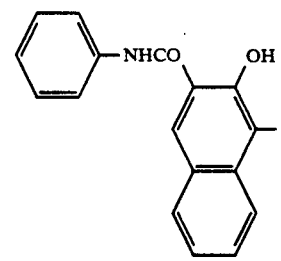 |
| 87 | 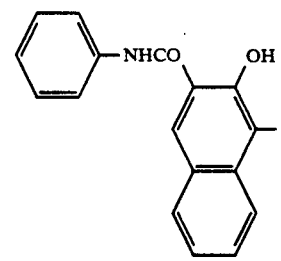 |
TABLE D-continued
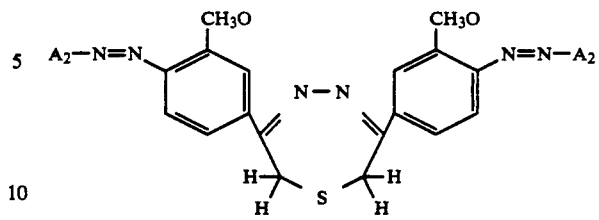
| COMPOUND No. | $A_2$ |
|---|---|
| 88 | 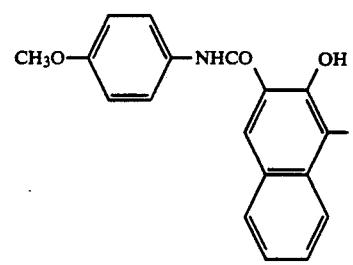 |
TABLE E
| COMPOUND No. | $A_2$ |
|---|---|
| 89 | 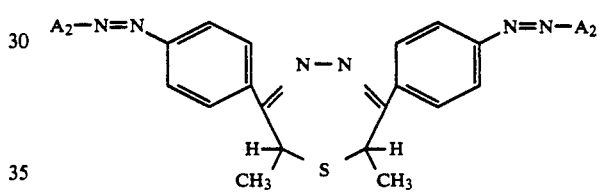 |
| 90 | 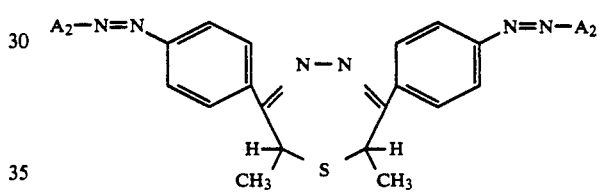 |

TABLE E-continued

[Structure: A₂—N=N—[phenyl]—C(=)—CH(CH₃)—S—CH(CH₃)—C(=)—[phenyl]—N=N—A₂, with central N=N bridge]

| COMPOUND No. | A₂ |
|---|---|
| 91 | 3-bromophenyl-NHCO-[2-hydroxy-naphthalene fused to NH-phenyl ring] |
| 92 | 2-methylphenyl-NHCO-[2-hydroxy-naphthalene fused to NH-phenyl ring] |
| 93 | 3-cyano-4-methyl-5-(...)-1-methyl-6-hydroxy-2-oxo-pyridine |
| 94 | 3-cyano-4-ethyl-5-(...)-1-phenyl-6-hydroxy-2-oxo-pyridine |
| 95 | 3-carbamoyl-4-methyl-5-(...)-1-ethyl-6-hydroxy-2-oxo-pyridine |

TABLE E-continued

[Same central structure as above]

| COMPOUND No. | A₂ |
|---|---|
| 96 | 3-carbamoyl-4-methyl-5-(...)-1-(4-chlorophenyl)-6-hydroxy-2-imino-pyridine (with CH₃ groups) |
| 97 | 3-ethoxycarbonyl-4-methyl-5-hydroxy-1-(4-methylphenyl)pyrazole |
| 98 | N-ethyl naphthalimide with OH and CH₃ substituents |

TABLE F

[Structure: A₂—N=N—[2-chlorophenyl]—C(=)—CH₂—S—CH₂—C(=)—[2-chlorophenyl]—N=N—A₂, with central N=N bridge]

| COMPOUND No. | A₂ |
|---|---|
| 99 | 4-(N,N-dimethylamino)phenyl |

TABLE F-continued
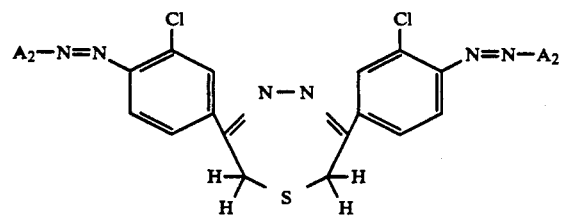
| COMPOUND No. | A₂ |
| --- | --- |
| 100 | 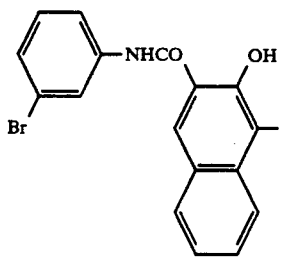 |
| 101 | 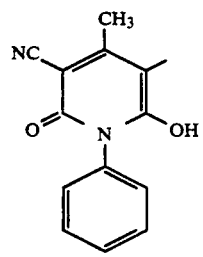 |
| 102 | 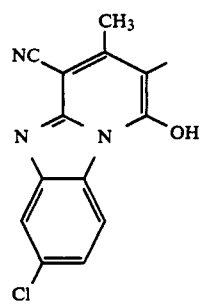 |
TABLE G
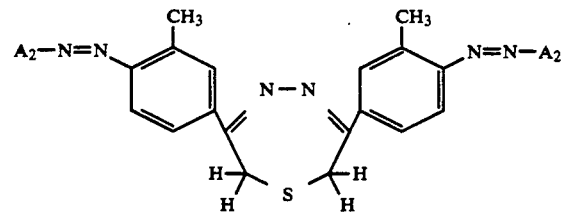
| COMPOUND No. | A₂ |
| --- | --- |
| 103 | 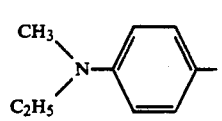 |
TABLE G-continued
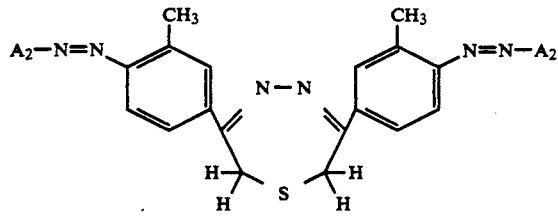
| COMPOUND No. | A₂ |
| --- | --- |
| 104 | 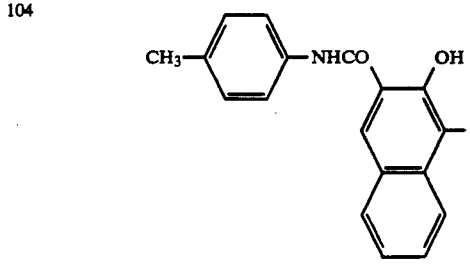 |
| 105 | 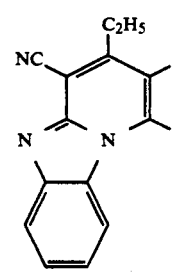 |
| 106 | 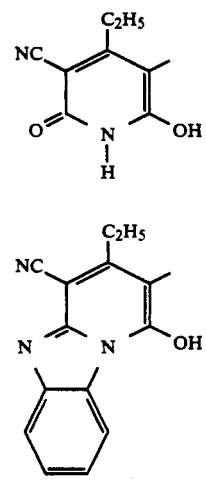 |
TABLE H
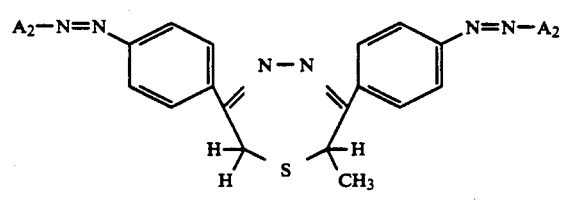
| COMPOUND No. | A₂ |
| --- | --- |
| 107 | 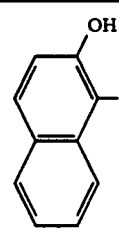 |

TABLE H-continued

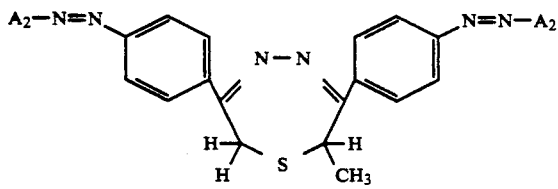

| COMPOUND No. | A₂ |
|---|---|
| 108 | 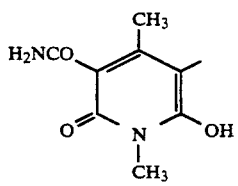 |
| 109 | 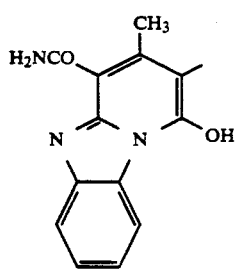 |
| 110 | 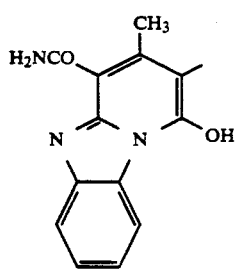 |

Note: compound 108 shows a structure with CH₃–C₆H₄–NHCO group attached to a naphthol-carbazole system; compounds 109 and 110 show pyridone-type couplers.

TABLE I

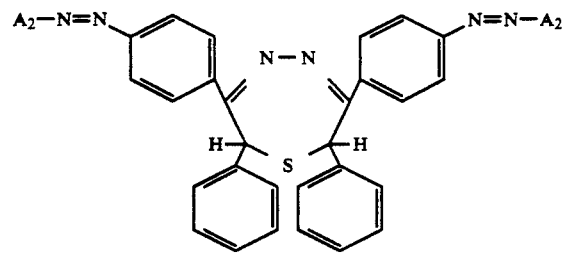

| COMPOUND No. | A₂ |
|---|---|
| 111 | 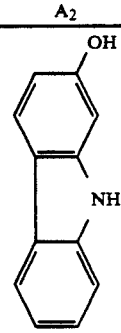 |
| 112 | 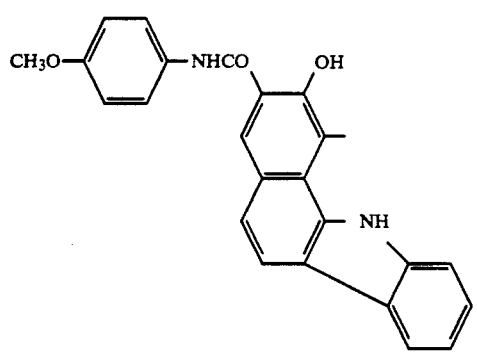 |
| 113 | 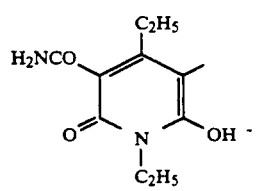 |
| 114 | 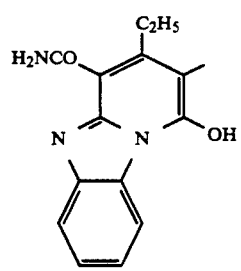 |

Bisazo compounds, represented by the foregoing general formula (IV) can be synthesized by diazotizing an amino compound represented by the following general formula (XXI) with a conventional method and coupling reacting obtained diazo compound with a corresponding coupler in an appropriate solvent (for example, N,N-dimethylformamide, dimethyl sulfoxide and so on) under the presence of a base.

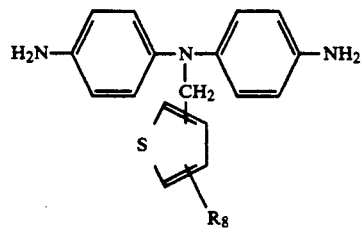
(XXI)
specific examples of the bisazo compounds of the general formula (IV) prepared in the above-mentioned manner include compounds as shown in Tables J and K.
TABLE J
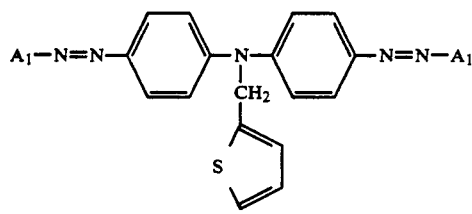
| COMPOUND No. | $A_1$ |
|---|---|
| 121 | 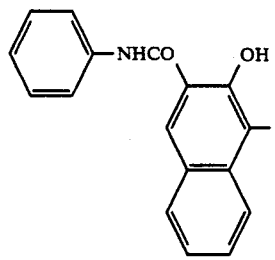 |
| 122 | 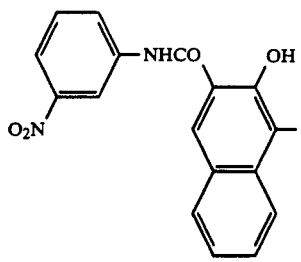 |
| 123 | 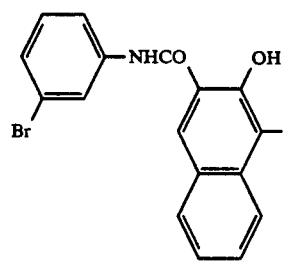 |
TABLE J-continued
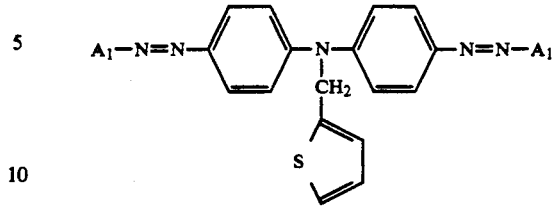
| COMPOUND No. | $A_1$ |
|---|---|
| 124 | 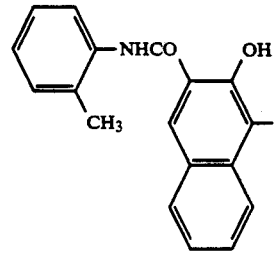 |
| 125 | 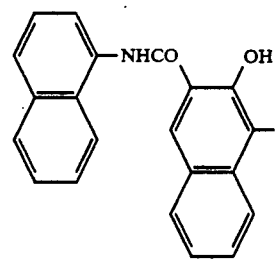 |
| 126 | 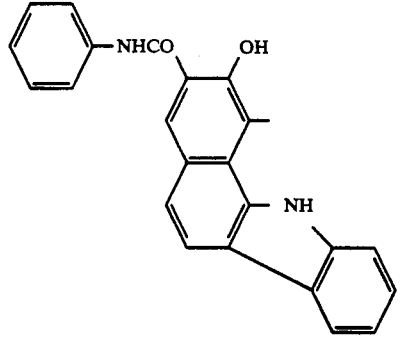 |
| 127 | 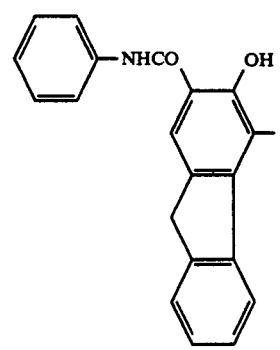 |

TABLE J-continued
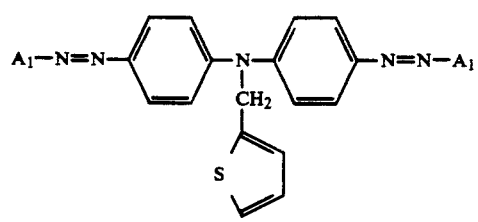
| COMPOUND No. | $A_1$ |
|---|---|
| 128 | 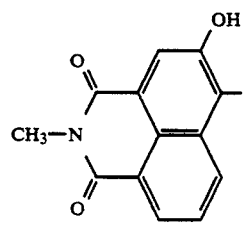 |
| 129 | 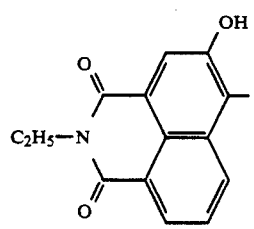 |
| 130 | 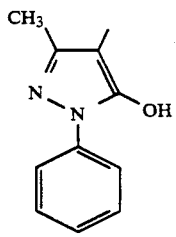 |
| 131 | 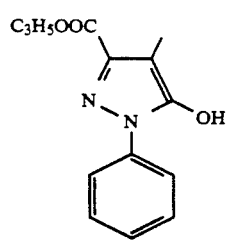 |
| 132 | 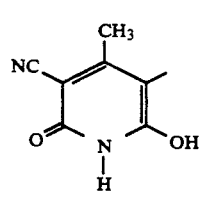 |
| 133 | 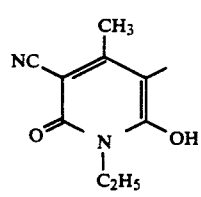 |
TABLE J-continued
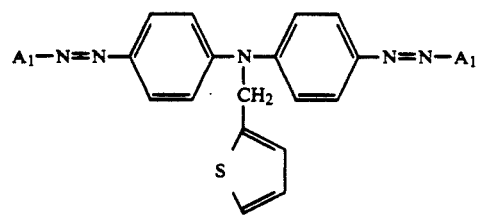
| COMPOUND No. | $A_1$ |
|---|---|
| 134 | 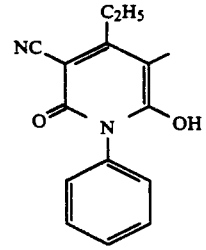 |
| 135 | 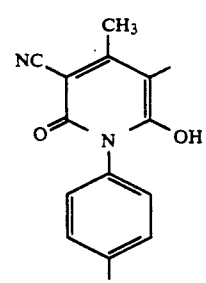 |
| 136 | 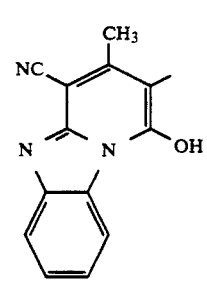 |
| 137 | 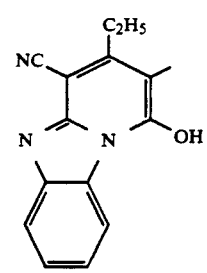 |
| 138 | 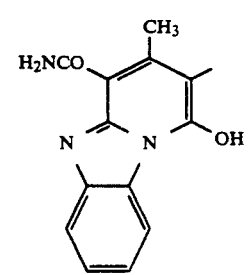 |

TABLE J-continued
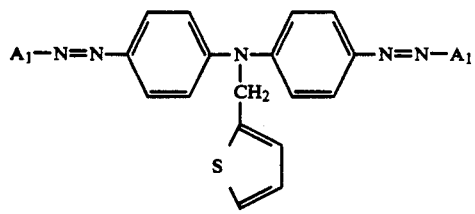
| COMPOUND No. | $A_1$ |
|---|---|
| 139 | |
| 140 | |
TABLE J-continued
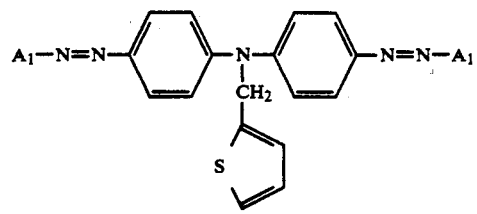
| COMPOUND No. | $A_1$ |
|---|---|
| 141 | |
| 142 | |
TABLE K
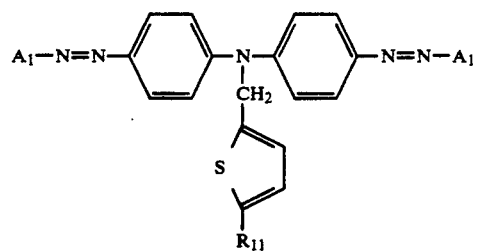
| COMPOUND No. | $R_{11}$ | $A_1$ |
|---|---|---|
| 143 | $CH_3$ | |
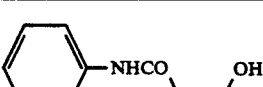

TABLE K-continued
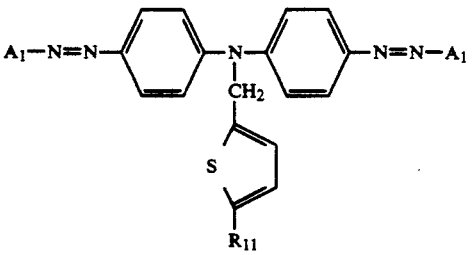
| COMPOUND No. | R₁₁ | A₁ |
|---|---|---|
| 144 | CH₃ | 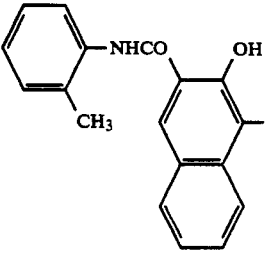 |
| 145 |  | 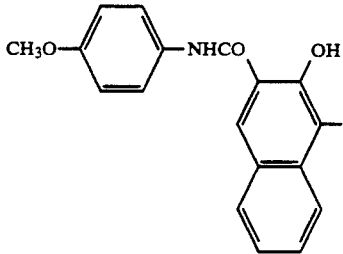 |
| 146 | CH₃ | 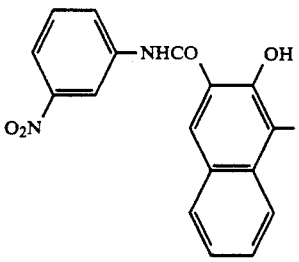 |
| 147 |  | 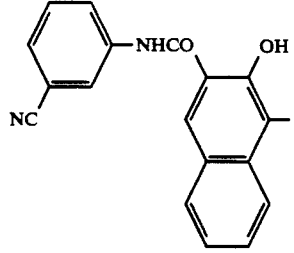 |
| 148 | CN | 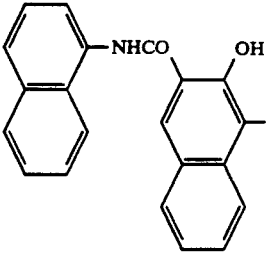 |

TABLE K-continued
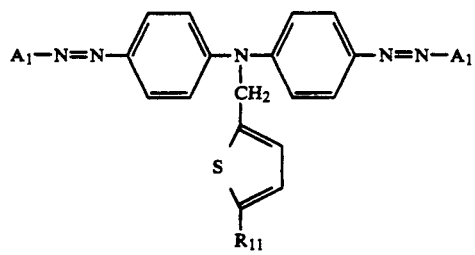
| COMPOUND No. | $R_{11}$ | $A_1$ |
|---|---|---|
| 149 | $CH_3$ | |
| 150 | $C_2H_5$ | |
| 151 | $CH_3$ | |
| 152 | Cl | |

TABLE K-continued
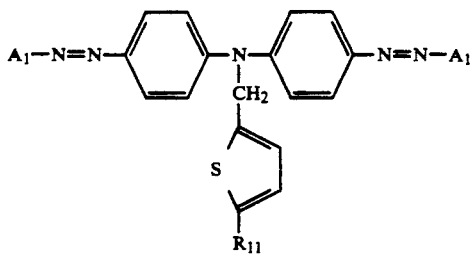
| COMPOUND No. | R11 | A1 |
|---|---|---|
| 153 |  | 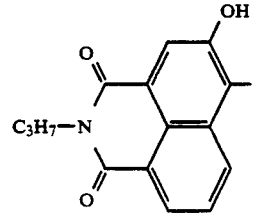 |
| 154 | CH3 | 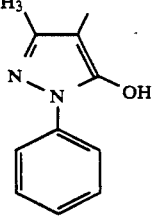 |
| 155 | CH3 | 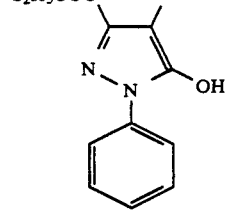 |
| 156 | C2H5 | 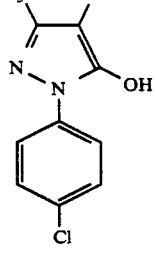 |
| 157 | CN | 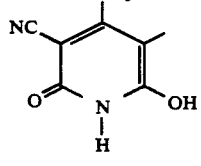 |
| 158 | CH3 | 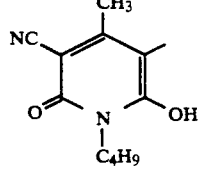 |

TABLE K-continued
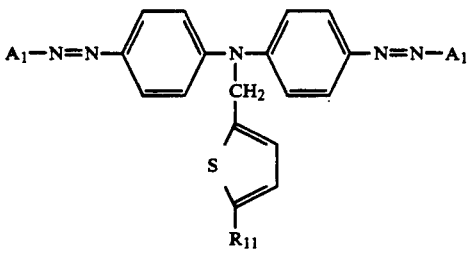
| COMPOUND No. | R$_{11}$ | A$_1$ |
|---|---|---|
| 159 | C$_2$H$_5$ | 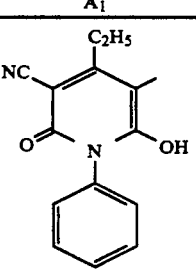 |
| 160 | (phenyl) | 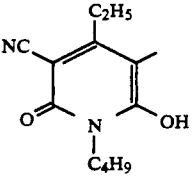 |
| 161 | CH$_3$ | 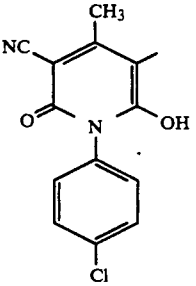 |
| 162 | Cl | 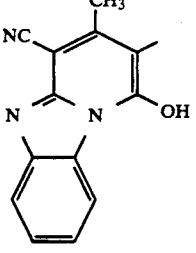 |
| 163 | C$_2$H$_5$ | 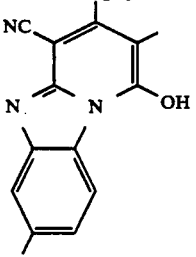 |

TABLE K-continued

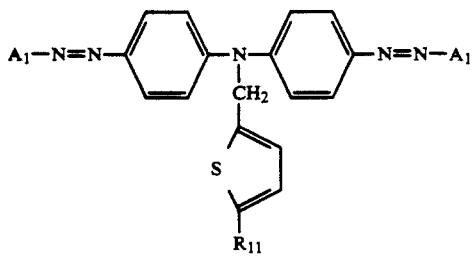

| COMPOUND No. | R_{11} | A_1 |
|---|---|---|
| 164 | CN | (structure: pyridone coupler with H_2NCO, CH_3, OH, N, fused benzene) |
| 165 | CH_3 | (structure: benzimidazole-naphthalenone with OH) or (alternative structure shown) |

Bisazo compounds, represented by the foregoing general formula (V) can be synthesized by diazotizing an amino compound represented by the following general formula (XXII) with a conventional method and coupling reacting obtained diazo compound with a corresponding coupler in an appropriate solvent (for example, N,N-dimethylformamide, dimethyl sulfoxide and so on) under the presence of a base.

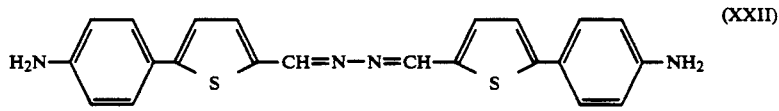

(XXII)

Specific examples of the bisazo compounds of the general formula (V) prepared in the above-mentioned manner include compounds as shown in Tables L and M.

TABLE L
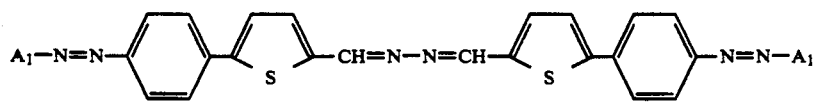
| COMPOUND No. | $A_1$ |
|---|---|
| 171 | 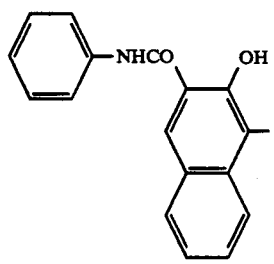 |
| 172 | 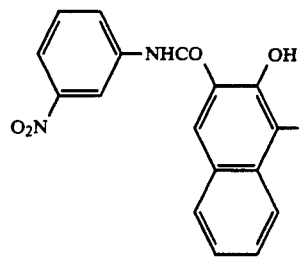 |
| 173 | 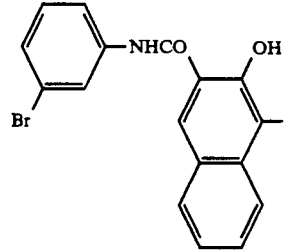 |
| 174 | 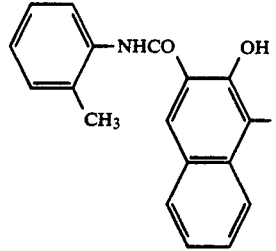 |
| 175 | 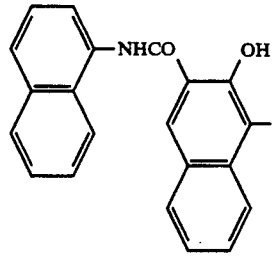 |

TABLE L-continued
| COMPOUND No. | $A_1$ |
|---|---|
| 176 | 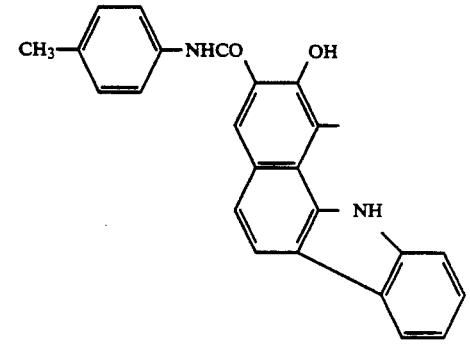 |
| 177 | 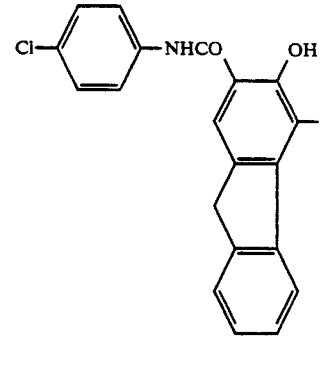 |
| 178 | 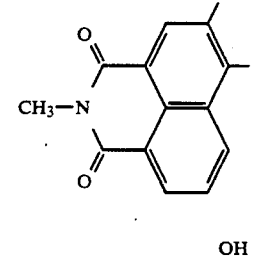 |
| 179 | 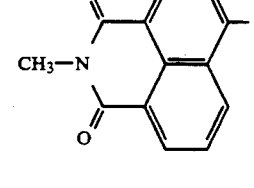 |
| 180 | 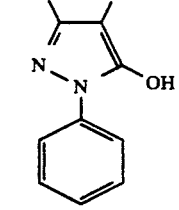 |

TABLE L-continued

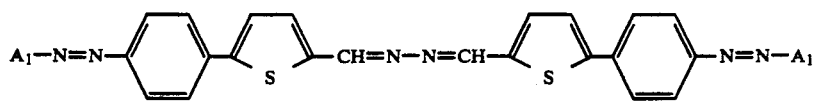

| COMPOUND No. | $A_1$ |
|---|---|
| 181 | ![structure] ethyl 3-methyl-5-hydroxy-1-(4-methylphenyl)pyrazole-4-carboxylate group with $C_2H_5OOC$, $CH_3$, OH, N—N, and p-tolyl |
| 182 | 3-cyano-4,5-dimethyl-6-hydroxy-2-oxo-1H-pyridine (NC, $CH_3$, $CH_3$, O, OH, NH) |
| 183 | 3-cyano-4,5-dimethyl-6-hydroxy-1-ethyl-2-oxopyridine (NC, $CH_3$, $CH_3$, O, OH, N—$C_2H_5$) |
| 184 | 3-cyano-4-ethyl-5-methyl-6-hydroxy-1-phenyl-2-oxopyridine (NC, $C_2H_5$, $CH_3$, O, OH, N-phenyl) |
| 185 | 3-cyano-4,5-dimethyl-6-hydroxy-1-(4-chlorophenyl)-2-oxopyridine (NC, $CH_3$, $CH_3$, O, OH, N-(4-Cl-phenyl)) |
| 186 | pyrido-benzimidazole with NC, $CH_3$, $CH_3$, OH |

TABLE L-continued $A_1-N{=}N-\phantom{x}\underset{S}{\underset{|}{\bigcirc}}-CH{=}N-N{=}CH-\underset{S}{\underset{|}{\bigcirc}}-\phantom{x}-N{=}N-A_1$

| COMPOUND No. | $A_1$ |
|---|---|
| 187 | pyridinone with CN, C₂H₅, CH₃, OH, =N–, N-phenyl substituents |
| 188 | pyridinone with H₂NCO, CH₃, CH₃, OH, =N–, N-phenyl substituents |
| 189 | pyrazolone with CH₃, CH₃, OH, N-(4-chlorophenyl) |
| 190 | 3-hydroxy-4-methyl-N-(3-methoxyphenyl)-2-naphthamide |
| 191 | 3-cyano-4-ethyl-5-methyl-6-hydroxy-1-butyl-2-pyridone |
| 192 | benzimidazolyl-hydroxy-methyl-naphthalimide | or

TABLE L-continued
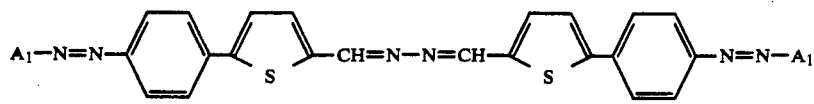
| COMPOUND No. | $A_1$ |
|---|---|
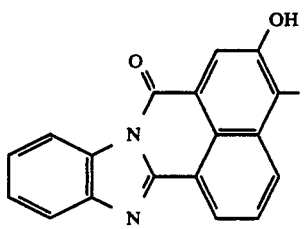
TABLE M
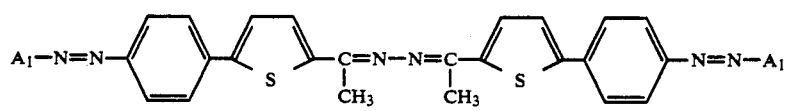
| COMPOUND No. | $A_1$ |
|---|---|
| 193 | 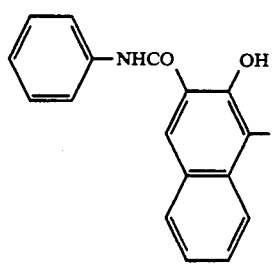 |
| 194 | 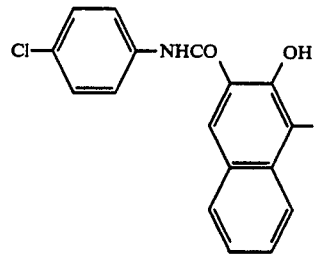 |
| 195 | 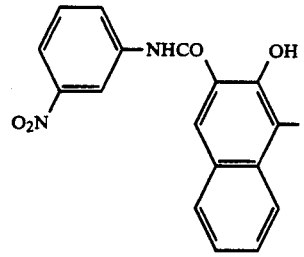 |

TABLE M-continued
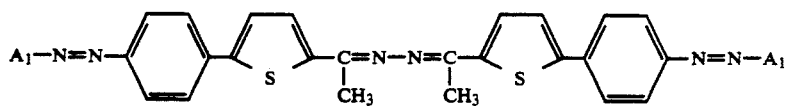
| COMPOUND No. | $A_1$ |
|---|---|
| 196 | 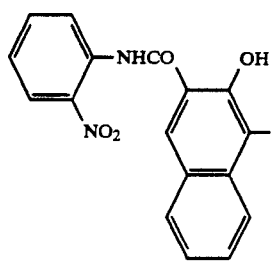 |
| 197 | 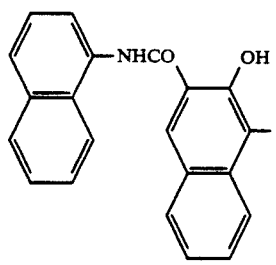 |
| 198 | 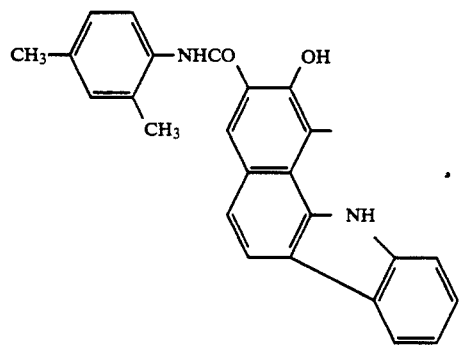 |
| 199 | 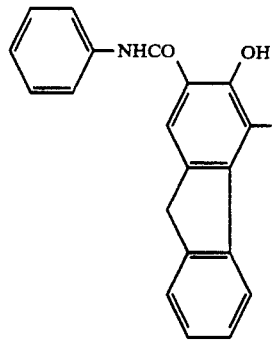 |
| 200 | 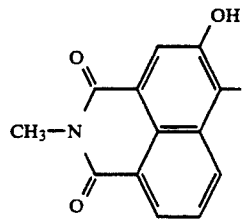 |

TABLE M-continued
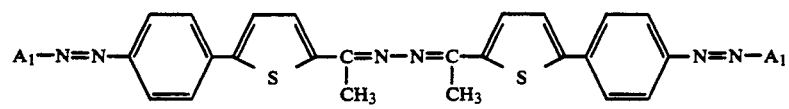
| COMPOUND No. | $A_1$ |
|---|---|
| 201 | 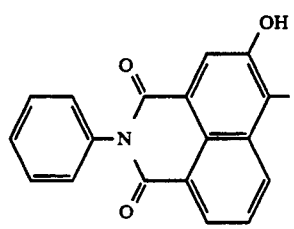 |
| 202 | 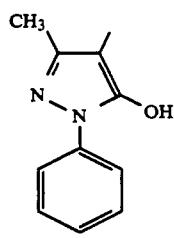 |
| 203 | 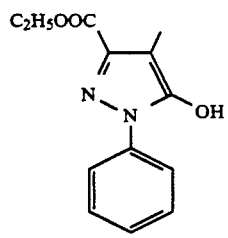 |
| 204 | 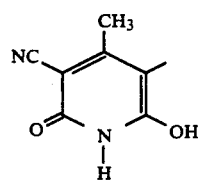 |
| 205 | 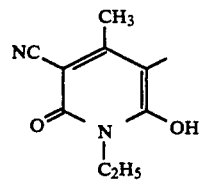 |
| 206 | 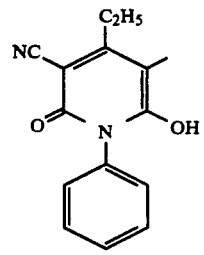 |

TABLE M-continued
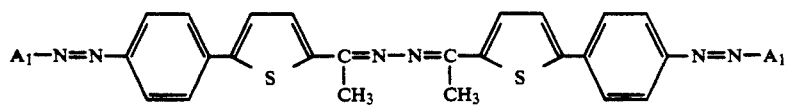
| COMPOUND No. | A$_1$ |
|---|---|
| 207 | 3-cyano-1-(4-chlorophenyl)-4,5-dimethyl-6-hydroxy-2-oxo-1,2-dihydropyridin-yl |
| 208 | 3-cyano-4,5-dimethyl-7-hydroxy-pyrido[1,2-a]benzimidazol-yl |
| 209 | 3-cyano-4-ethyl-5-methyl-7-hydroxy-pyrido[1,2-a]benzimidazol-yl |
| 210 | 3-carbamoyl-4,5-dimethyl-7-hydroxy-pyrido[1,2-a]benzimidazol-yl |
| 211 | 3,4-dimethyl-5-hydroxy-1-(4-methylphenyl)pyrazol-yl |

TABLE M-continued

A₁—N=N—⟨phenyl⟩—⟨thiophene-S⟩—C(CH₃)=N—N=C(CH₃)—⟨thiophene-S⟩—⟨phenyl⟩—N=N—A₁

| COMPOUND No. | A₁ |
|---|---|
| 212 | ⟨phenyl⟩-NHCO-⟨3-hydroxy-4-methylnaphthalene⟩ |
| 213 | 3-cyano-4-ethyl-5-methyl-6-hydroxy-1-butyl-2-pyridone |
| 214 | benzimidazole-fused hydroxymethylnaphthalenone (two tautomers shown) |

Bisazo compounds, represented by the foregoing general formula (VI) can be synthesized by diazotizing an amino compound represented by the following general formula (XXIII) with a conventional method and coupling reacting obtained diazo compound with a corresponding coupler in an appropriate solvent (for example, N,N-dimethylformamide, dimethyl sulfoxide and so on) under the presence of a base.

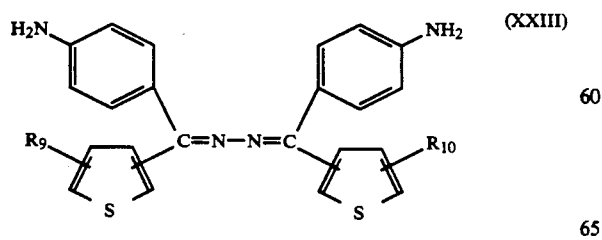

(XXIII)

Specific examples of the bisazo compounds of the general formula (VI) prepared in the above-mentioned manner include compounds as shown in Tables N and P.

TABLE N
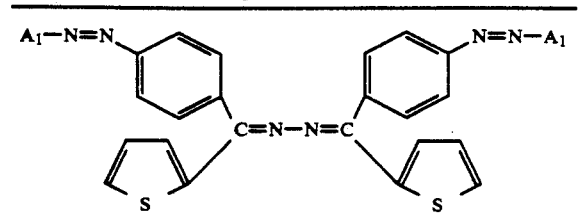
| COMPOUND No. | $A_1$ |
|---|---|
| 221 | 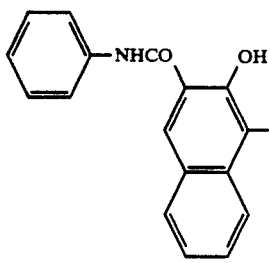 |
| 222 | 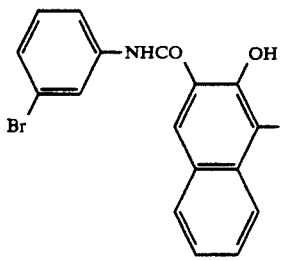 |
| 223 | 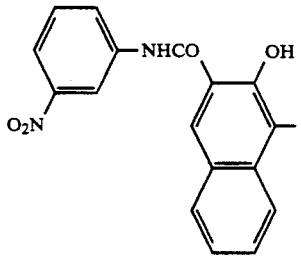 |
| 224 | 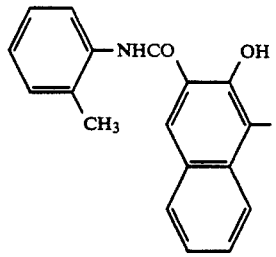 |
| 225 | 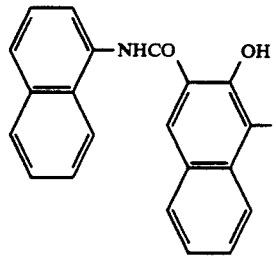 |
TABLE N-continued
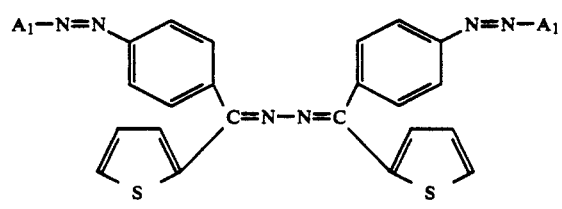
| COMPOUND No. | $A_1$ |
|---|---|
| 226 | 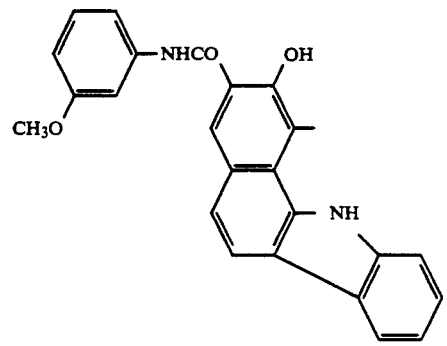 |
| 227 | 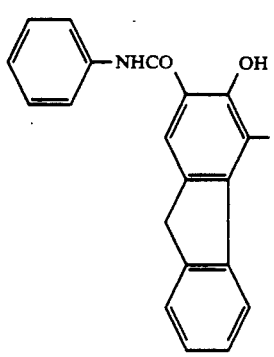 |
| 228 | 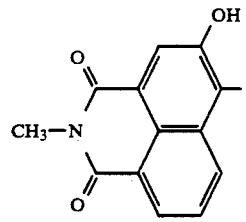 |
| 229 | 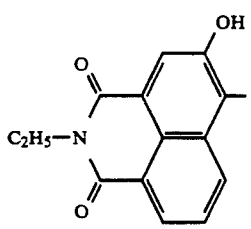 |
| 230 | 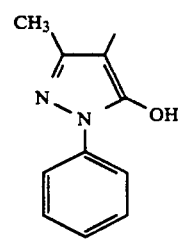 |

TABLE N-continued

| COMPOUND No. | $A_1$ |
|---|---|
| 231 | 3-ethoxycarbonyl-4-methyl-5-hydroxy-1-phenylpyrazole |
| 232 | 3-cyano-4-methyl-6-hydroxy-2-oxo-1H-pyridine |
| 233 | 3-cyano-4-methyl-6-hydroxy-2-oxo-1-propylpyridine |
| 234 | 3-cyano-4-ethyl-5-methyl-6-hydroxy-2-oxo-1-phenylpyridine |
| 235 | 3-cyano-4,5-dimethyl-6-hydroxy-2-oxo-1-(4-chlorophenyl)pyridine |
| 236 | 3-cyano-4-methyl-6-hydroxy-pyrido-benzimidazole |
| 237 | 3-cyano-4-ethyl-5-methyl-6-hydroxy-pyrido-benzimidazole |
| 238 | 3-carbamoyl-4,5-dimethyl-7-hydroxy-pyrido-benzimidazole |
| 239 | 3,4-dimethyl-5-hydroxy-1-(4-methylphenyl)pyrazole |
| 240 | 2-hydroxy-3-(3-methylphenyl)carbamoyl-4-methylnaphthalene |

TABLE N-continued
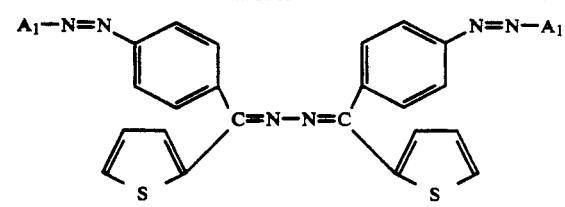
| COMPOUND No. | $A_1$ |
|---|---|
| 241 | 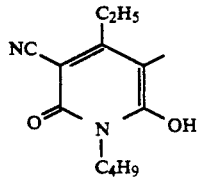 |
| 242 | 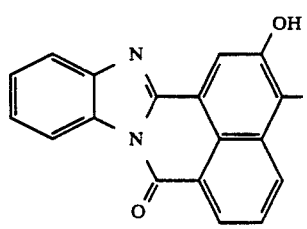 or 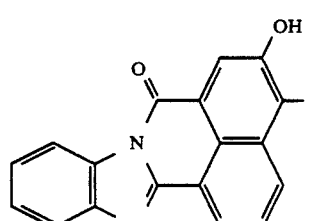 |
TABLE P
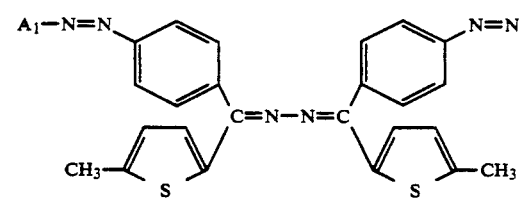
| COMPOUND No. | $A_1$ |
|---|---|
| 243 | 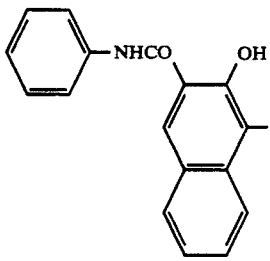 |
TABLE P-continued
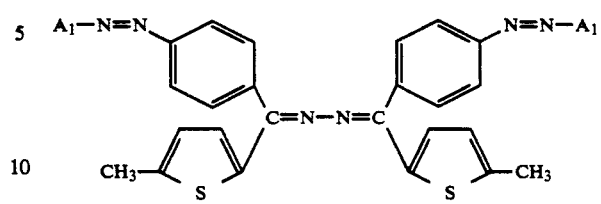
| COMPOUND No. | $A_1$ |
|---|---|
| 244 | 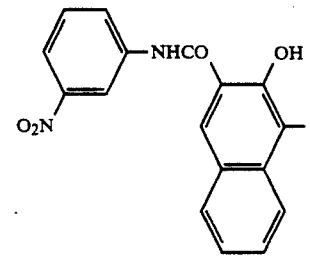 |
| 245 | 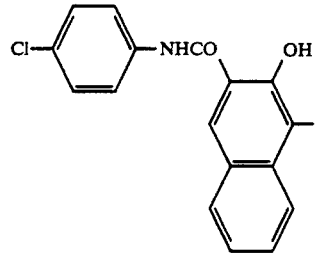 |
| 246 | 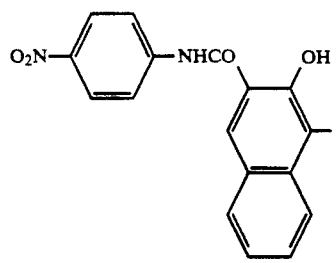 |
| 247 | 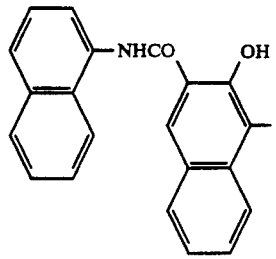 |

TABLE P-continued
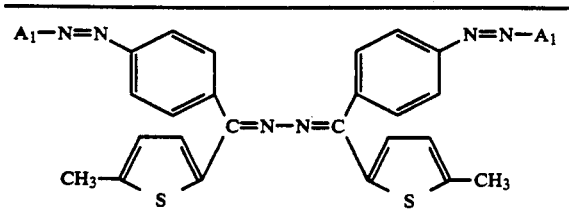
| COMPOUND No. | $A_1$ |
|---|---|
| 248 | 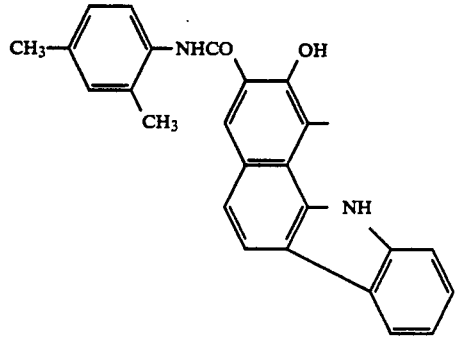 |
| 249 | 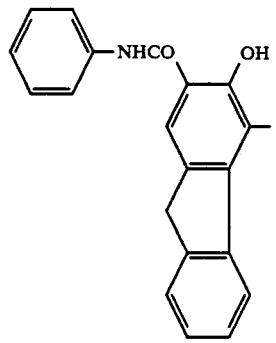 |
| 250 | 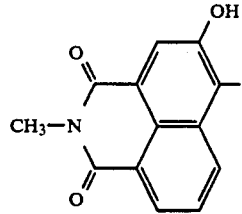 |
| 251 | 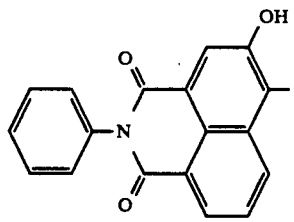 |
| 252 | 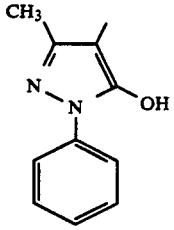 |
TABLE P-continued
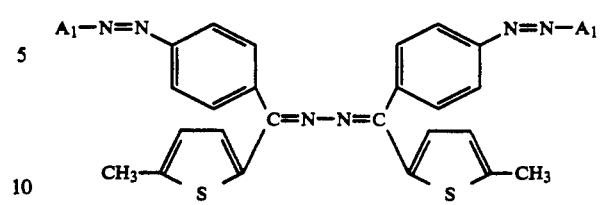
| COMPOUND No. | $A_1$ |
|---|---|
| 253 | 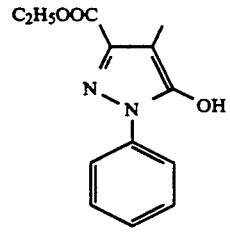 |
| 254 | 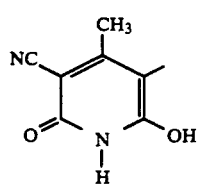 |
| 255 | 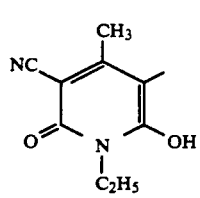 |
| 256 | 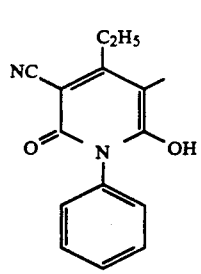 |
| 257 | 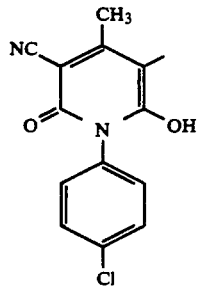 |

TABLE P-continued

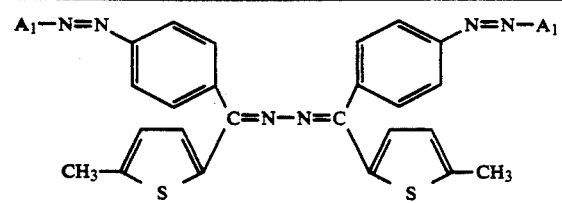

| COMPOUND No. | $A_1$ |
|---|---|
| 258 | 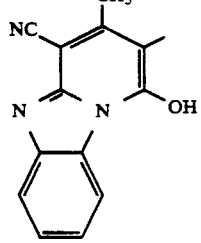 |
| 259 | 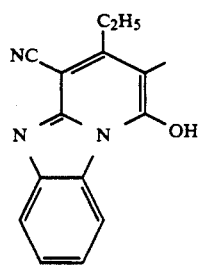 |
| 260 | 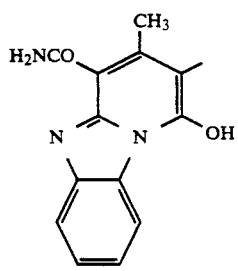 |
| 261 | 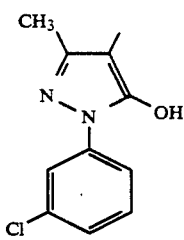 |

TABLE P-continued

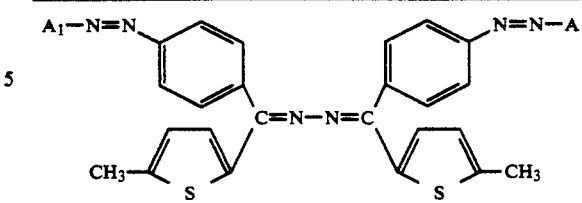

| COMPOUND No. | $A_1$ |
|---|---|
| 262 | 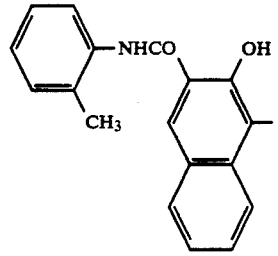 |
| 263 | 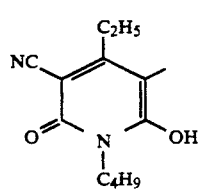 |
| 264 | 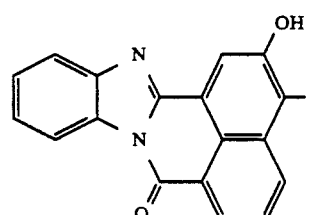 <br> or <br> 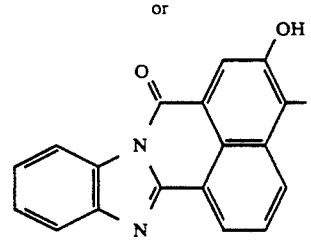 |

Bisazo compounds, represented by the foregoing general formula (VII) can be synthesized by diazotizing an amino compound represented by the following general formula (XXIV) with a conventional method and coupling reacting obtained diazo compound with a corresponding coupler in an appropriate solvent (for example, N,N-dimethylformamide, dimethyl sulfoxide and so on) under the presence of a base.

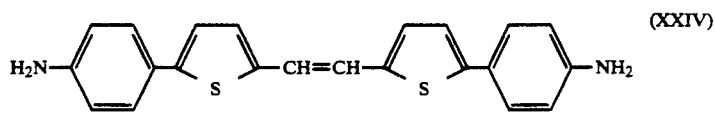

(XXIV)

Specific examples of the bisazo compounds of the general formula (VII) prepared in the above-mentioned manner include compounds as shown in Tables Q and R.

TABLE Q
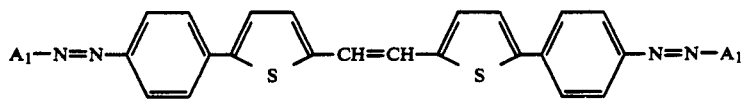
| COMPOUND No. | $A_1$ |
|---|---|
| 271 | 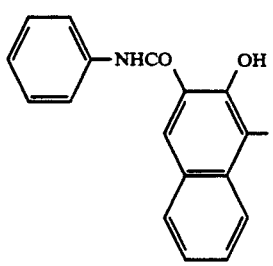 |
| 272 | 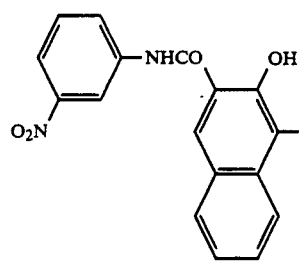 |
| 273 | 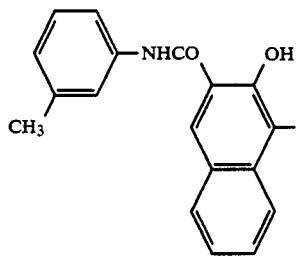 |
| 274 | 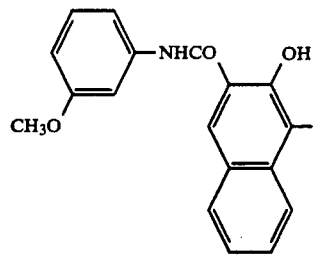 |
| 275 | 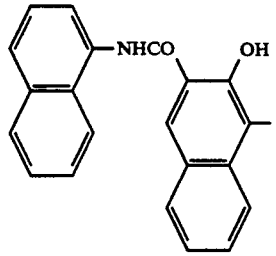 |

TABLE Q-continued
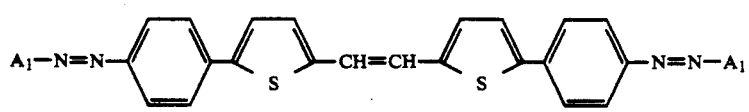
| COMPOUND No. | $A_1$ |
|---|---|
| 276 | 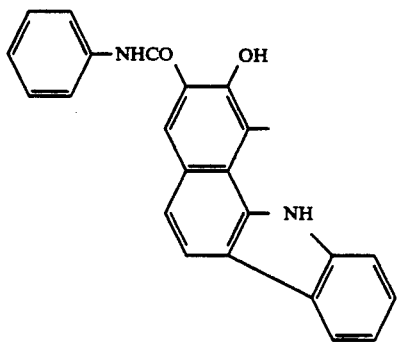 |
| 277 | 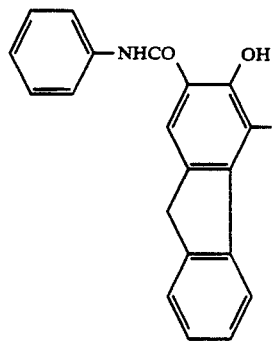 |
| 278 | 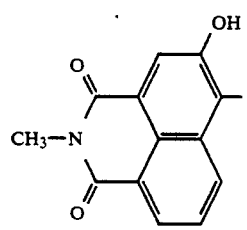 |
| 279 | 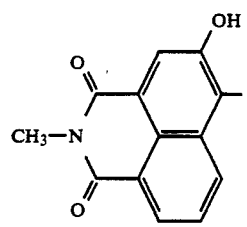 |
| 280 | 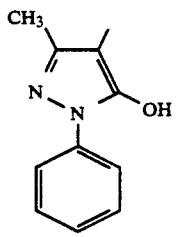 |

TABLE Q-continued
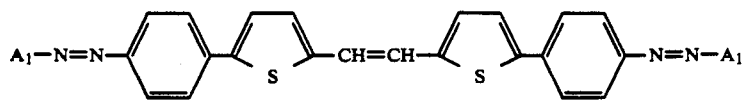
| COMPOUND No. | $A_1$ |
|---|---|
| 281 | 3-ethoxycarbonyl-4-methyl-5-hydroxy-1-phenylpyrazole |
| 282 | 3-cyano-4,5-dimethyl-6-hydroxy-2-oxo-1H-pyridine |
| 283 | 3-cyano-1-ethyl-4,5-dimethyl-6-hydroxy-2-oxopyridine |
| 284 | 3-cyano-4-ethyl-5-methyl-6-hydroxy-2-oxo-1-phenylpyridine |
| 285 | 3-cyano-4,5-dimethyl-6-hydroxy-1-(4-chlorophenyl)-2-oxopyridine |
| 286 | benzimidazole-fused cyanopyridine derivative |

TABLE Q-continued
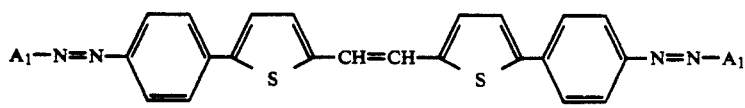
| COMPOUND No. | $A_1$ |
|---|---|
| 287 | 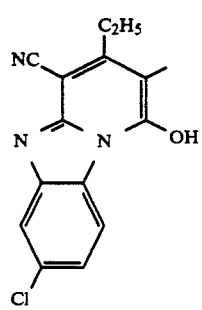 |
| 288 | 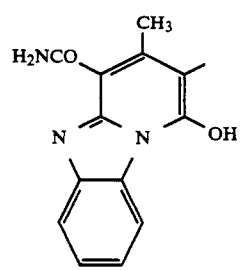 |
| 289 | 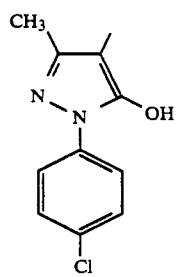 |
| 290 | 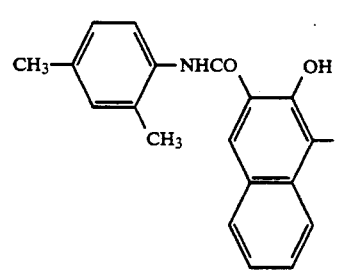 |
| 291 | 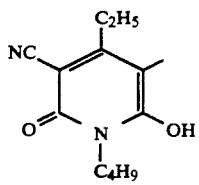 |

TABLE Q-continued $A_1-N=N-$⟨phenyl⟩$-$⟨thiophene-S⟩$-CH=CH-$⟨thiophene-S⟩$-$⟨phenyl⟩$-N=N-A_1$

| COMPOUND No. | $A_1$ |
|---|---|
| 292 | ⟨benzimidazole-naphthalene with OH, C=O⟩ or ⟨benzimidazole-naphthalene with C=O, OH⟩ |

TABLE R $A_1-N=N-$⟨phenyl⟩$-$⟨thiophene-S⟩$-C(CH_3)=C(CH_3)-$⟨thiophene-S⟩$-$⟨phenyl⟩$-N=N-A_1$

| COMPOUND No. | $A_1$ |
|---|---|
| 293 | ⟨phenyl-NHCO-naphthalene-OH⟩ |
| 294 | ⟨3-Br-phenyl-NHCO-naphthalene-OH⟩ |
| 295 | ⟨3-$O_2N$-phenyl-NHCO-naphthalene-OH⟩ |

TABLE R-continued
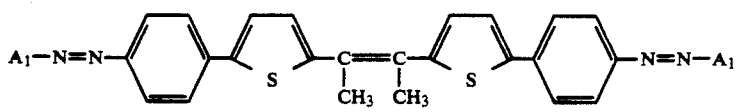
| COMPOUND No. | $A_1$ |
|---|---|
| 296 | 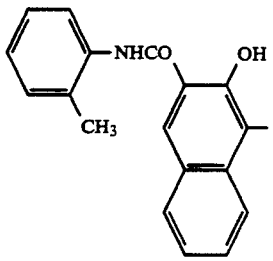 |
| 297 | 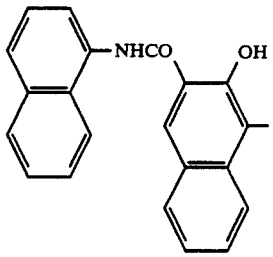 |
| 298 | 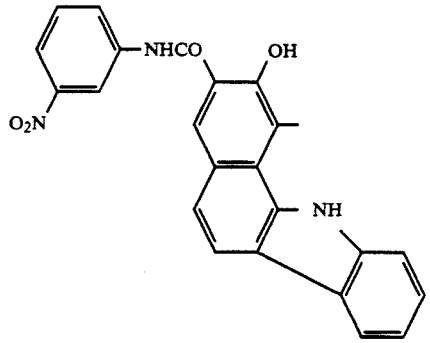 |
| 299 | 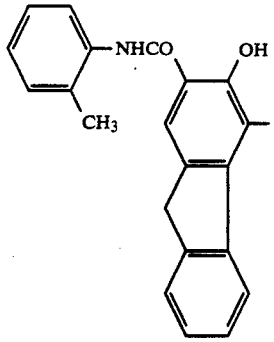 |
| 300 | 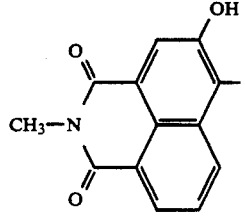 |

TABLE R-continued
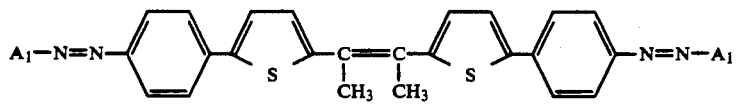
| COMPOUND No. | $A_1$ |
|---|---|
| 301 | |
| 302 | |
| 303 | |
| 304 | |
| 305 | |
| 306 | |

TABLE R-continued
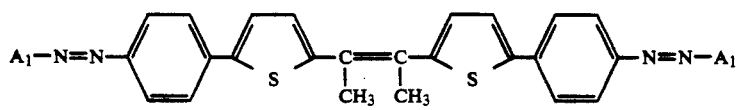
| COMPOUND No. | $A_1$ |
|---|---|
| 307 | 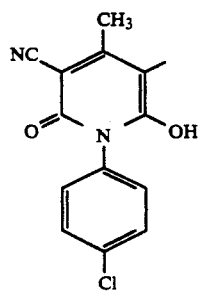 |
| 308 | 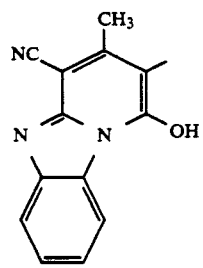 |
| 309 | 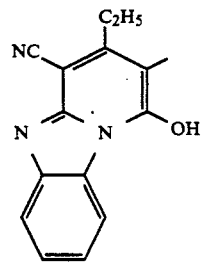 |
| 310 | 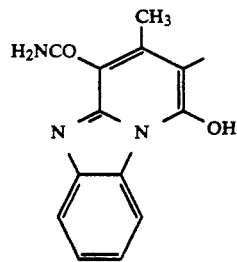 |
| 311 | 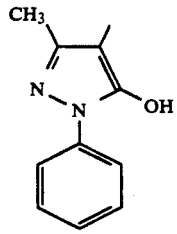 |

TABLE R-continued

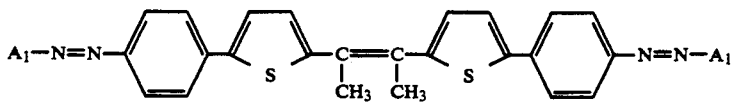

| COMPOUND No. | A₁ |
|---|---|
| 312 | 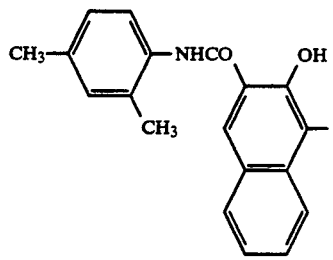 |
| 313 | 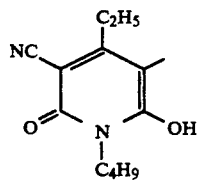 |
| 314 | 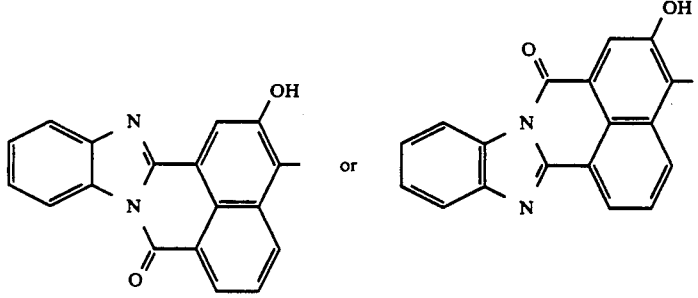 |

Bisazo compounds, represented by the foregoing general formula (VIII) can be synthesized by diazotizing an amino compound represented by the following general formula (XXV) with a conventional method and coupling reacting obtained diazo compound with a corresponding coupler in an appropriate solvent (for example, N,N-dimethylformamide, dimethyl sulfoxide and so on) under the presence of a base.

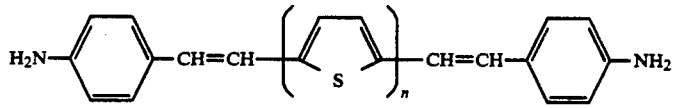

(XXV)

Specific examples of the bisazo compounds of the general formula (VIII) prepared in the above-mentioned manner include compounds as shown in Tables S to U.

TABLE S
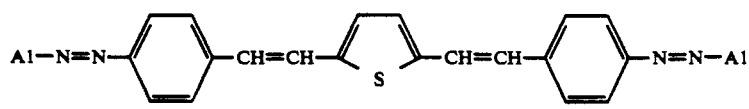
| COMPOUND No. | A1 |
|---|---|
| 321 | 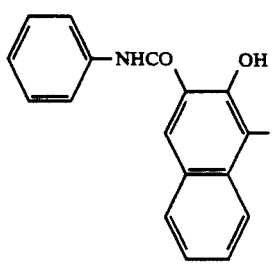 |
| 322 | 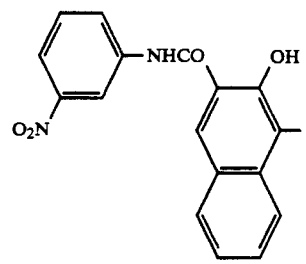 |
| 323 | 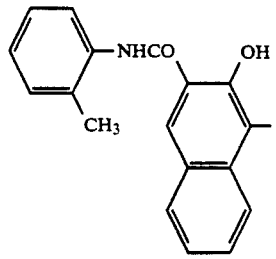 |
| 324 | 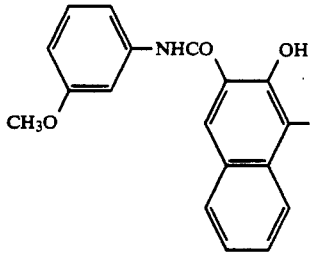 |
| 325 | 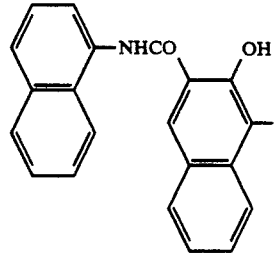 |

TABLE S-continued
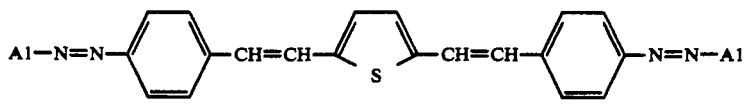
| COMPOUND No. | A1 |
|---|---|
| 326 | 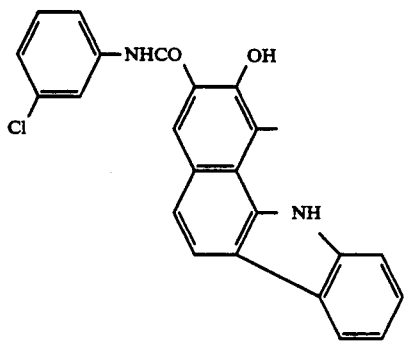 |
| 327 | 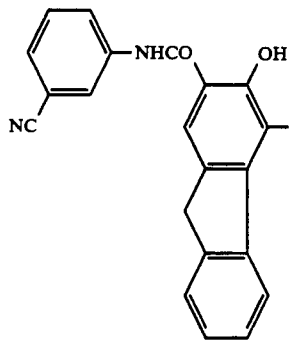 |
| 328 | 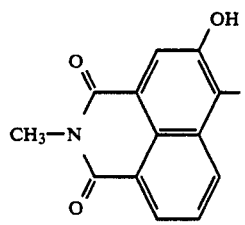 |
| 329 | 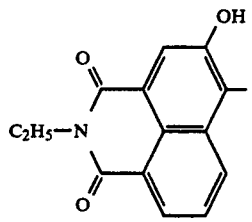 |
| 330 | 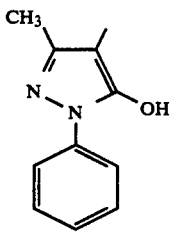 |

TABLE S-continued
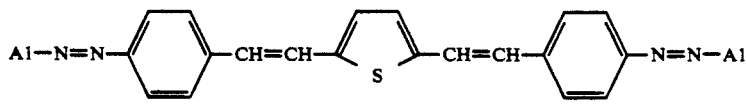
| COMPOUND No. | A1 |
|---|---|
| 331 | 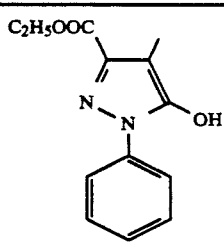 |
| 332 | 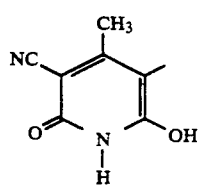 |
| 333 | 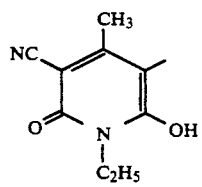 |
| 334 | 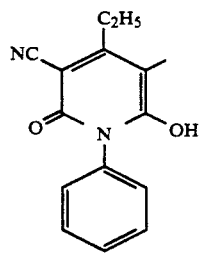 |
| 335 | 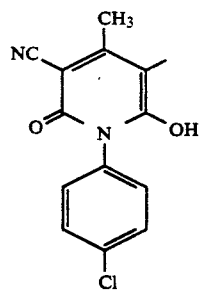 |
| 336 | 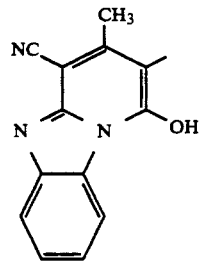 |

TABLE S-continued
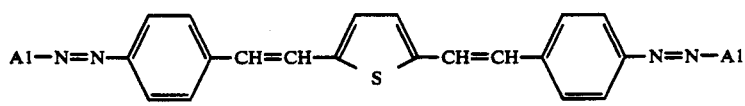
| COMPOUND No. | A1 |
|---|---|
| 337 | 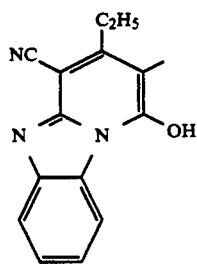 |
| 338 | 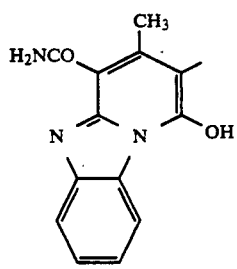 |
| 339 | 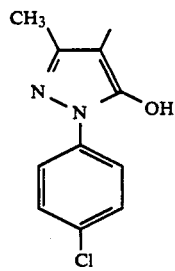 |
| 340 | 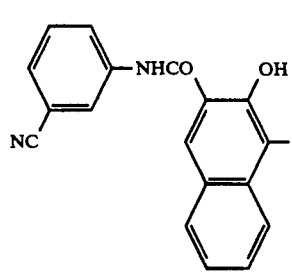 |
| 341 | 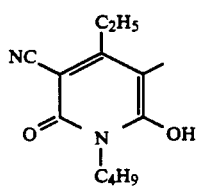 |

TABLE S-continued
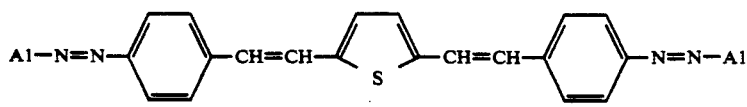
| COMPOUND No. | A1 |
|---|---|
| 342 | 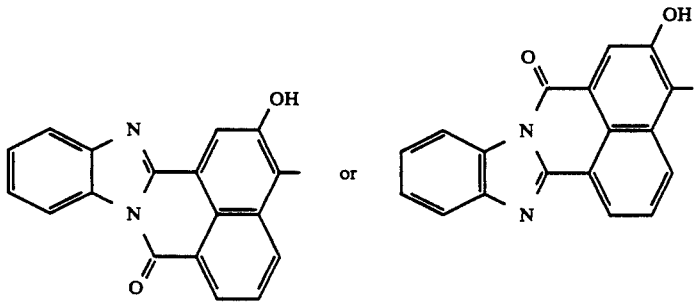 |
TABLE T
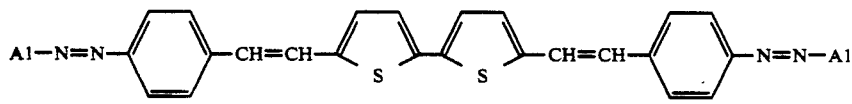
| COMPOUND No. | A1 |
|---|---|
| 343 | 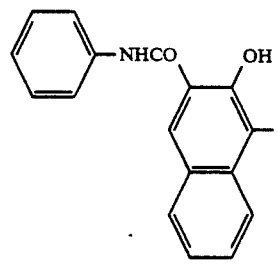 |
| 344 | 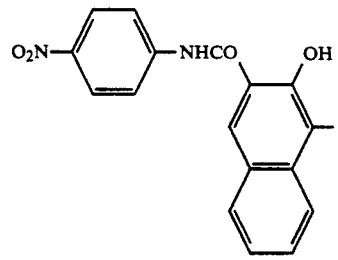 |
| 345 | 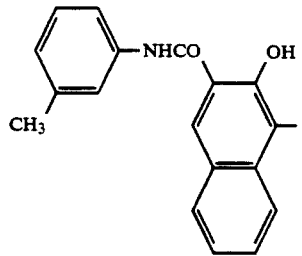 |

TABLE T-continued
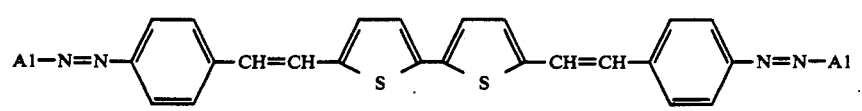
| COMPOUND No. | A1 |
|---|---|
| 346 | 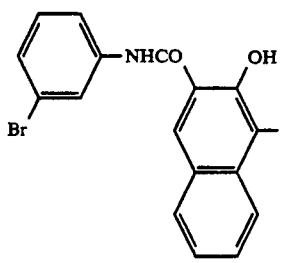 |
| 347 | 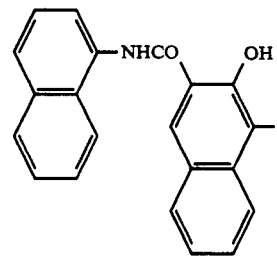 |
| 348 | 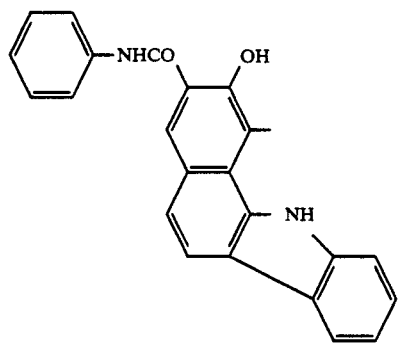 |
| 349 | 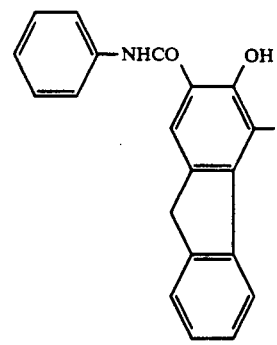 |
| 350 | 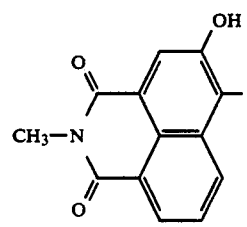 |

TABLE T-continued
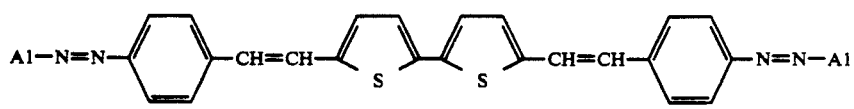
| COMPOUND No. | A1 |
|---|---|
| 351 | 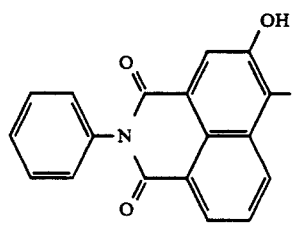 |
| 352 | 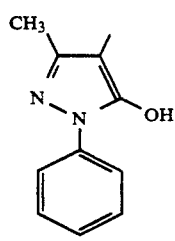 |
| 353 | 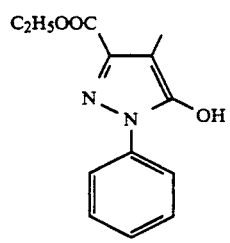 |
| 354 | 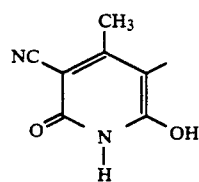 |
| 355 | 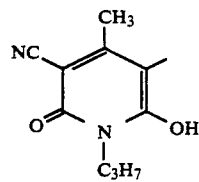 |
| 356 | 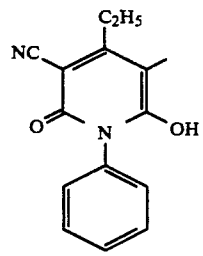 |

TABLE T-continued
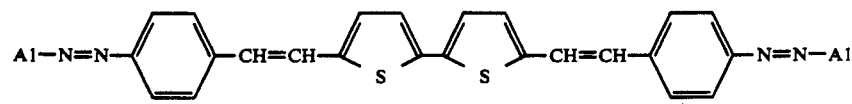
| COMPOUND No. | A1 |
|---|---|
| 357 | 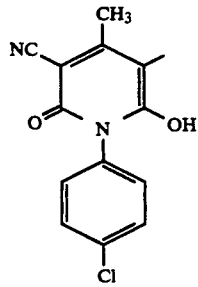 |
| 358 | 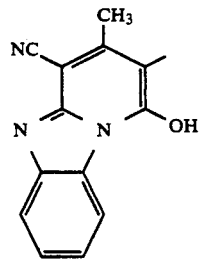 |
| 359 | 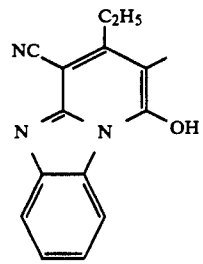 |
| 360 | 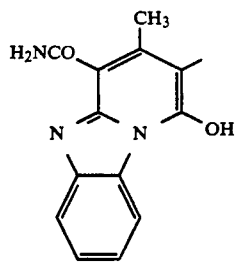 |
| 361 | 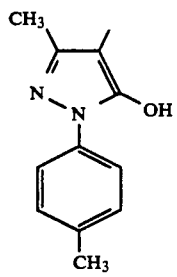 |

TABLE T-continued
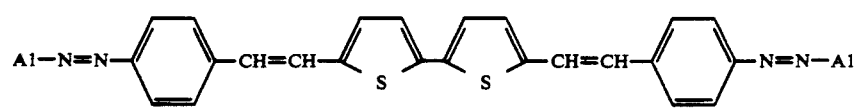
| COMPOUND No. | A1 |
|---|---|
| 362 | 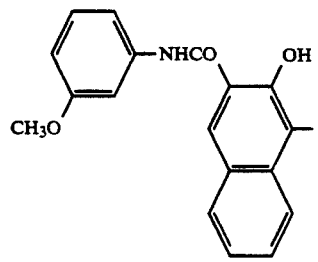 |
| 363 | 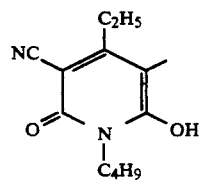 |
| 364 | 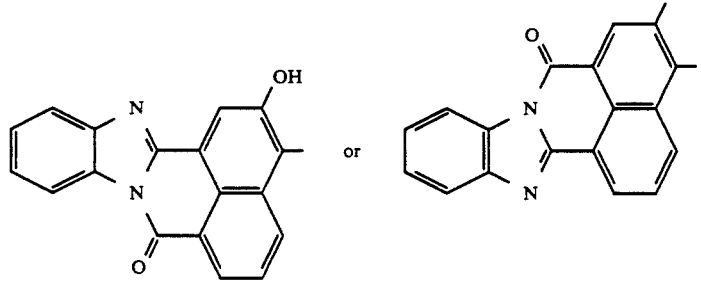 |
TABLE U
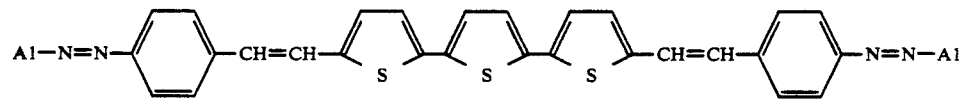
| COMPOUND No. | A1 |
|---|---|
| 365 | 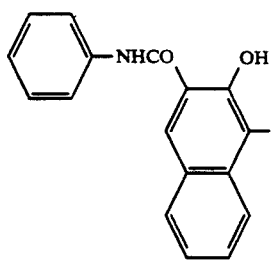 |
| 366 | 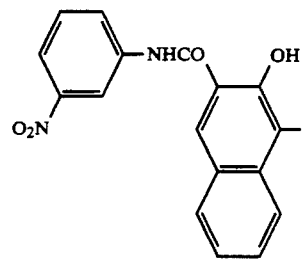 |

TABLE U-continued
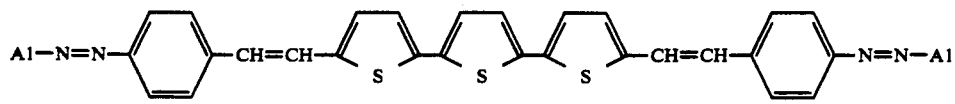
| COMPOUND No. | A1 |
|---|---|
| 367 | 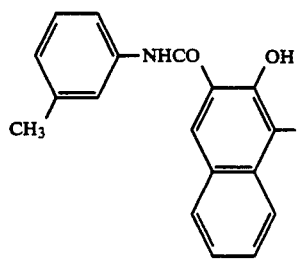 |
| 368 | 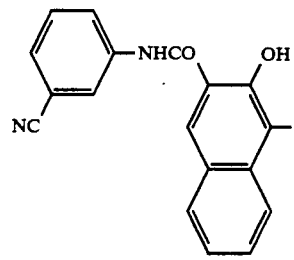 |
| 369 | 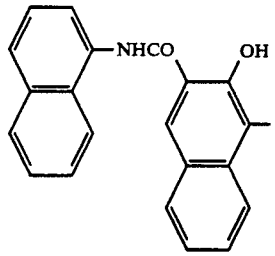 |
| 370 | 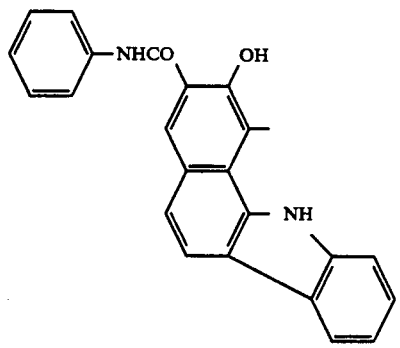 |

TABLE U-continued
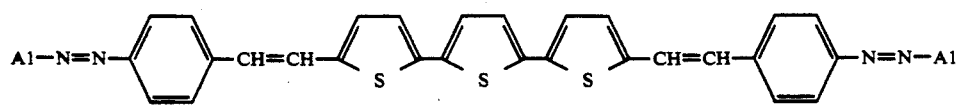
| COMPOUND No. | A1 |
|---|---|
| 371 | (2-phenylcarbamoyl-3-hydroxy-4-methyl-fluorene derivative) |
| 372 | N-methyl-6-hydroxy-5-methyl-naphthalimide |
| 373 | N-propyl-6-hydroxy-5-methyl-naphthalimide |
| 374 | 3-methyl-4-methyl-5-hydroxy-1-phenylpyrazole |
| 375 | 3-ethoxycarbonyl-4-methyl-5-hydroxy-1-phenylpyrazole |
| 376 | 3-cyano-4-methyl-5-methyl-6-hydroxy-2-pyridone |

TABLE U-continued
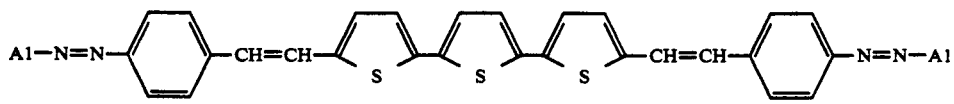
| COMPOUND No. | A1 |
|---|---|
| 377 | 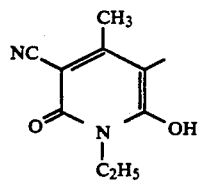 |
| 378 | 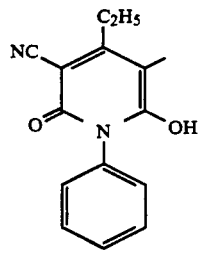 |
| 379 | 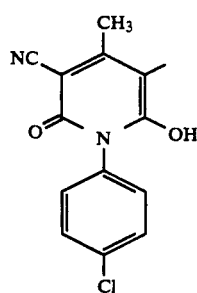 |
| 380 | 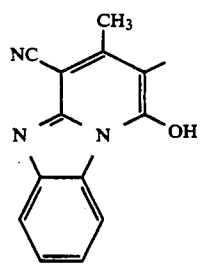 |
| 381 | 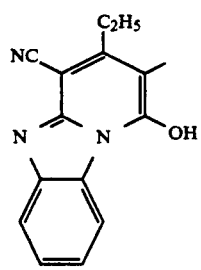 |

TABLE U-continued

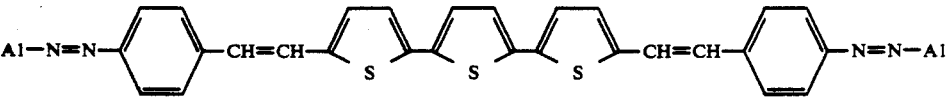

| COMPOUND No. | A1 |
|---|---|
| 382 | 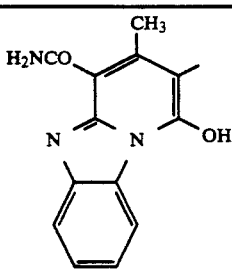 |
| 383 | 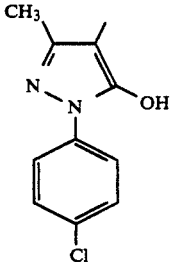 |
| 384 | 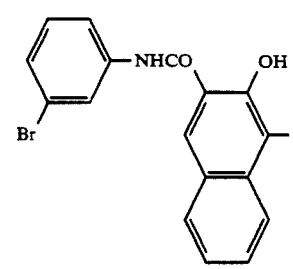 |
| 385 | 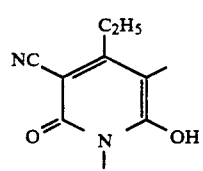 |
| 386 | 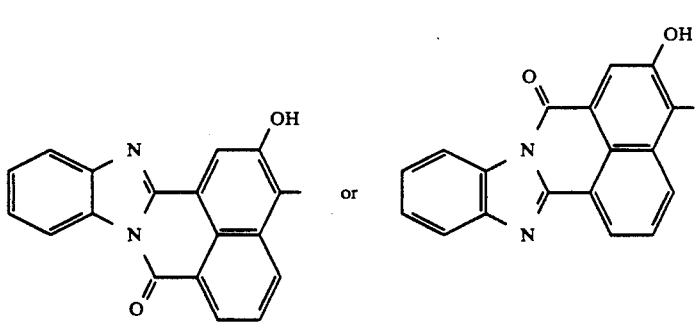 |

As for the use of the bisazo compounds represented by the general formulae given above in photosensitive layers, there has been no precedent before. In the course of the intensive study of various organic materials as made in an attempt to achieve the above object, the present inventors conducted a number of experiments with those bisazo compounds and, as a result, found that the use of such specific bisazo compounds represented by the above general formulae (I) to (VIII) as charge generating substances is very effective in improving electrophotographic characteristics. Based on this finding, photoconductors having high sensitivity and good repeated use characteristics are obtained.

Examples will now be given, wherein various compounds represented by the general formulae (I) to (VIII) were respectively used to produce photoconductors.

EXAMPLE 1

50 parts by weight of the bisazo compound No. 1, 100 parts by weight of a polyester resin (Vylon 200, manufactured by Toyobo Co., Ltd.) and 100 parts by weight of 1-phenyl-3-(p-diethylaminaostyryl)-5-(p-diethylaminophenyl)-2-pyrazoline (ASPP) are kneaded with tetrahydrofuran (THF) as a solvent with a mixer for 3 hours to prepare a coating liquid. The coating liquid was applied onto an aluminum-deposited polyester film (Al-PET) as an electroconductive substrate by means of the wire bar technique to form a photosensitive layer having a dry thickness of 15 μm. Thus, a photoconductor with the structure shown in FIG. 1 was produced.

EXAMPLE 2

First, 100 parts by weight of p-diethylaminobenzaldehyde-diphenylhydrazone (ABPH) and 100 parts by weight of polycarbonate resin (Panlite L-1250 manufactured by Teijin chemicals Co., Ltd.) were solved in methylene chloride to prepare a coating liquid. The coating liquid was applied onto an aluminum-deposited polyester film substrate by the wire bar technique to form a charge transporting layer having a dry thickness of 15 μm. 50 parts by weight of the compound No. 2 and 50 parts by weight of a polyester resin (Vylon 200) were kneaded with a mixer for 3 hours together with THF as a solvent to prepare a coating liquid, which was then applied onto the charge transporting layer by the wire bar technique to form a charge generating layer having a dry thickness of 0.5 μm. Thus, a photoconductor with a structure corresponding to that shown in FIG. 3 was produced. The covering layer, which is not directly related to the present invention was not provided.

EXAMPLE 3

A charge transporting layer was formed in substantially the same manner as in Example 2 except that α-phenyl-4'-N,N-dimethylaminostilbene, which is a stilbene compound, was used to replace ABPH as a charge transporting substance. Then a charge generating layer was formed on the charge transporting layer in the same manner as in Example 2, thus a photoconductor was produced.

EXAMPLE 4

A charge transporting layer was formed in substantially the same manner as in Example 2 except that tri(p-tolyl)amine, which is a triphenylamine compound, was used to replace ABPH as a charge transporting substance. Then a charge generating layer was formed on the charge transporting layer in the same manner as in Example 2, thus a photoconductor was produced.

EXAMPLE 5

A charge transporting layer was formed in substantially the same manner as in Example 2 except that 2,5-bis(p-diethylaminophenyl)-1,3,4-oxadiazole, which is an oxadiazole compound, was used to replace ABPH as a charge transporting substance. Then a charge generating layer was formed on the charge transporting layer in the same manner as in Example 2, thus a photoconductor was produced.

The electrophotographic characteristics of the photoconductors thus produced were measured by utilizing an electrostatic recording paper testing apparatus (Kawaguchi Denki Model SP-428). The result obtained are shown in Table 1.

The surface potential $V_s$ (volts) of each photoconductor is an initial surface potential which was measured when the surface of the photoconductor was positively charged in the dark by corona discharge at $+6.0$ KV for 10 seconds. After the discontinuation of the corona discharge, the photoconductor was allowed to stand in the dark for 2 seconds, after which the surface potential $V_d$ (volts) of the photoconductor was measured. Subsequently, the surface of the photoconductor was irradiated with white light at an illuminance of 2 luxes and the time (seconds) required for the irradiation to decrease the surface potential of the photoconductor to half of the $V_d$ was measured, than from which the half decay exposure amount $E_{\frac{1}{2}}$ (lux·sec) was calculated. Also, the surface potential of the photoconductor after 10 seconds of irradiation thereof with white light at an illuminance of 2 luxes was measured as a residual potential $V_r$ (volts).

TABLE 1

|  | $V_s$ (volt) | $V_r$ (volt) | $E_{1/2}$ (lux · sec) |
| --- | --- | --- | --- |
| Example 1 | 600 | 50 | 4.3 |
| Example 2 | 620 | 40 | 5.0 |
| Example 3 | 620 | 40 | 5.2 |
| Example 4 | 650 | 80 | 4.1 |
| Example 5 | 600 | 60 | 4.3 |

As can be seen in Table 1, the photoconductors of Examples 1 to 5 have good characteristics in the half decay exposure amounts $E_{\frac{1}{2}}$ and the residual potentials $V_r$.

EXAMPLE 6

100 parts by weight of each of respective bisazo compounds Nos. from 3 to 22 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer having a thickness of about 15 μm, thus photoconductors were produced.

The electrophotographic characteristics of the photoconductors thus produced were measured by utilizing an electrostatic recording paper testing apparatus SP-428. The results of the measurements are shown in Table 2.

The surface potential $V_s$ (volts) of each photoconductor is an initial surface potential which was measured when the surface of the photoconductor was positively charged in the dark by corona discharge at $-6.0$ kV for 10 seconds. After the discontinuation of the corona discharge, the photoconductor was allowed to stand in the dark for 2 seconds, after which the surface potential $V_d$ (volts) of the photoconductor was measured. Subsequently, the surface of the photoconductor was irradiated with white light at an illuminance of 2 luxes and the time (seconds) required for the irradiation to decrease the surface potential of the photoconductor to half of the $V_d$ was measured, then from which the half decay exposure amount $E_{\frac{1}{2}}$ (lux·sec) was calculated.

As can be seen in Table 2, the photoconductors using the bisazo compound Nos. 3 to 22 as a charge generating substance have good characteristics in the half decay exposure amount $E_{\frac{1}{2}}$.

TABLE 2

| Compound No. | $E_{1/2}$ (lux · sec) |
|---|---|
| 3 | 3.9 |
| 4 | 6.0 |
| 5 | 4.4 |
| 6 | 6.0 |
| 7 | 7.2 |
| 8 | 6.8 |
| 9 | 5.5 |
| 10 | 4.4 |
| 11 | 5.1 |
| 12 | 6.3 |
| 13 | 4.3 |
| 14 | 5.9 |
| 15 | 5.8 |
| 16 | 4.6 |
| 17 | 5.2 |
| 18 | 5.8 |
| 19 | 5.4 |
| 20 | 7.6 |
| 21 | 6.1 |
| 22 | 4.9 |

EXAMPLE 7

A photoconductor was produced in the same manner as in Example 1 except that compound No. 31 was used to replace compound No. 1 as a charge generating substance.

EXAMPLE 8

A photoconductor was produced in the same manner as in Example 2 except that compound No. 32 was used to replace compound No. 2 as a charge generating substance.

EXAMPLE 9

A charge transporting layer was formed in substantially the same manner as in Example 8 except that α-phenyl-4'-N,N-dimethylaminostilbene was used to replace ABPH as a charge transporting substance. Then a charge generating layer was formed on the charge transporting layer in the same manner as in Example 8, thus a photoconductor was produced.

EXAMPLE 10

A charge transporting layer was formed in substantially the same manner as in Example 8 except that tri(p-tolyl)amine was used to replace ABPH as a charge transporting substance. Then a charge generating layer was formed on the charge transporting layer in the same manner as in Example 8, thus a photoconductor was produced.

EXAMPLE 11

A charge transporting layer was formed in substantially the same manner as in Example 8 except that 2,5-bis(p-diethylaminophenyl)-1,3,4-oxadiazole was used to replace ABPH as a charge transporting substance. Then a charge generating layer was formed on the charge transporting layer in the same manner as in Example 8, thus a photoconductor was produced.

The electrophotographic characteristics of the photoconductor thus produced were measured in the same manner as in Examples 1 to 5 by utilizing an electrostatic recording paper testing apparatus Model SP-428. The result obtained are shown in Table 3.

TABLE 3

|  | $V_s$ (volt) | $V_r$ (volt) | $E_{1/2}$ (lux · sec) |
|---|---|---|---|
| Example 7 | 600 | 50 | 4.3 |
| Example 8 | 620 | 40 | 5.0 |
| Example 9 | 620 | 40 | 5.2 |
| Example 10 | 650 | 80 | 4.1 |
| Example 11 | 600 | 60 | 4.3 |

As can be seen in Table 3, the photoconductors of Examples 7 to 11 have good characteristics in the half decay exposure amounts $E_{\frac{1}{2}}$ and the residual potentials $V_r$.

EXAMPLE 12

100 parts by weight of each of respective bisazo compounds Nos. from 33 to 52 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 8 was applied on the respective charge generating layer having a thickness of about 15 μm, thus photoconductors were produced.

The electrophotographic characteristics of the photoconductors thus produced were measured by utilizing an electrostatic recording paper testing apparatus SP-428 and in the same manner as in Example 6. The results of the measurements are shown in Table 4.

As can be seen in Table 4, the photoconductors using the bisazo compound Nos. 33 to 52 as a charge generating substance have good characteristics in the half decay exposure amount $E_{\frac{1}{2}}$.

TABLE 4

| Compound No. | $E_{1/2}$ (lux · sec) |
|---|---|
| 33 | 3.9 |
| 34 | 6.0 |
| 35 | 4.4 |
| 36 | 6.0 |
| 37 | 7.2 |
| 38 | 6.8 |
| 39 | 5.5 |
| 40 | 4.4 |
| 41 | 5.1 |
| 42 | 6.3 |
| 43 | 4.3 |
| 44 | 5.9 |
| 45 | 5.8 |
| 46 | 4.6 |
| 47 | 5.2 |
| 48 | 5.8 |
| 49 | 5.4 |
| 50 | 7.6 |
| 51 | 6.1 |
| 52 | 4.9 |

EXAMPLE 13

A photoconductor was produced in the same manner as in Example 1 except that compound No. 61 was used to replace compound No. 1 as a charge generating substance.

EXAMPLE 14

A photoconductor was produced in the same manner as in Example 2 except that compound No. 62 was used to replace compound No. 2 as a charge generating substance.

EXAMPLE 15

A charge transporting layer was formed in substantially the same manner as in Example 14 except that α-phenyl-4'-N,N-dimethylaminostilbene was used to replace ABPH as a charge transporting substance. Then a charge generating layer was formed on the charge transporting layer in the same manner as in Example 14, thus a photoconductor was produced.

EXAMPLE 16

A charge transporting layer was formed in substantially the same manner as in Example 14 except that tri(p-tolyl)amine was used to replace ABPH as a charge transporting substance. Then a charge generating layer was formed on the charge transporting layer in the same manner as in Example 14, thus a photoconductor was produced.

EXAMPLE 17

A charge transporting layer was formed in substantially the same manner as in Example 14 except that 2,5-bis(p-diethylaminophenyl)-1,3,4-oxadiazole was used to replace ABPH as a charge transporting substance. Then a charge generating layer was formed on the charge transporting layer in the same manner as in Example 14, thus a photoconductor was produced.

The electrophotographic characteristics of the photoconductors thus produced were measured by utilizing an electrostatic recording paper testing apparatus Model SP-428 and in the same manner as in Examples 1 to 5. The result obtained are shown in Table 5.

TABLE 5

|  | $V_s$ (volt) | $V_r$ (volt) | $E_{1/2}$ (lux · sec) |
| --- | --- | --- | --- |
| Example 13 | 600 | 80 | 6.0 |
| Example 14 | 650 | 60 | 4.2 |
| Example 15 | 630 | 90 | 5.3 |
| Example 16 | 700 | 100 | 5.9 |
| Example 17 | 620 | 70 | 4.8 |

As can be seen in Table 5, the photoconductors of Examples 13 to 17 have good characteristics in the half decay exposure amounts $E_{\frac{1}{2}}$ and the residual potentials $V_r$.

EXAMPLE 18

100 parts by weight of each of respective bisazo compounds Nos. from 63 to 114 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 14 was applied on the respective charge generating layer having a thickness of about 15 μm, thus photoconductors were produced.

The electrophotographic characteristics of the photoconductors thus produced were measured by utilizing an electrostatic recording paper testing apparatus SP-428 and in the same manner as in the Example 6. The results of the measurements are shown in Table 6.

As can be seen in Table 6, the photoconductors using the bisazo compound Nos. 63 to 114 as a charge generating substance have good characteristics in the half decay exposure amount $E_{\frac{1}{2}}$.

TABLE 6

| Compound No. | $E_{1/2}$ (lux · sec) |
| --- | --- |
| 63 | 5.8 |
| 64 | 4.2 |
| 65 | 6.9 |
| 66 | 3.4 |
| 67 | 4.9 |
| 68 | 5.3 |
| 69 | 6.6 |
| 70 | 6.1 |
| 71 | 5.8 |
| 72 | 4.3 |
| 73 | 3.9 |
| 74 | 4.7 |
| 75 | 6.1 |
| 76 | 5.4 |
| 77 | 5.7 |
| 78 | 5.0 |
| 79 | 3.8 |
| 80 | 5.6 |
| 81 | 6.3 |
| 82 | 4.2 |
| 83 | 4.9 |
| 84 | 6.5 |
| 85 | 5.7 |
| 86 | 5.3 |
| 87 | 6.1 |
| 88 | 4.9 |
| 89 | 5.5 |
| 90 | 4.8 |
| 91 | 4.3 |
| 92 | 5.6 |
| 93 | 6.8 |
| 94 | 6.1 |
| 95 | 6.0 |
| 96 | 3.9 |
| 97 | 4.8 |
| 98 | 5.2 |
| 99 | 5.9 |
| 100 | 4.4 |
| 101 | 6.9 |
| 102 | 6.3 |
| 103 | 5.4 |
| 104 | 6.2 |
| 105 | 3.1 |
| 106 | 6.5 |
| 107 | 7.3 |
| 108 | 4.2 |
| 109 | 6.4 |
| 110 | 5.1 |
| 111 | 6.7 |
| 112 | 3.8 |
| 113 | 4.6 |
| 114 | 5.2 |

EXAMPLE 19

A photoconductor was produced in the same manner as in Example 1 except that compound No. 121 was used to replace compound No. 1 as a charge generating substance.

EXAMPLE 20

A photoconductor was produced in the same manner as in Example 2 except that compound No. 122 was used to replace compound No. 2 as a charge generating substance.

EXAMPLE 21

A charge transporting layer was formed in substantially the same manner as in Example 20 except that α-phenyl-4'-N,N-dimethylaminostilbene was used to replace ABPH as a charge transporting substance. Then a charge generating layer was formed on the charge transporting layer in the same manner as in Example 20, thus a photoconductor was produced.

EXAMPLE 22

A charge transporting layer was formed in substantially the same manner as in Example 20 except that tri(p-tolyl)amine was used to replace ABPH as a charge transporting substance. Then a charge generating layer was formed on the charge transporting layer in the same manner as in Example 20, thus a photoconductor was produced.

EXAMPLE 23

A charge transporting layer was formed in substantially the same manner as in Example 20 except that 2,5-bis(p-diethylaminophenyl)-1,3,4-oxadiazole was used to replace ABPH as a charge transporting substance. Then a charge generating layer was formed on the charge transporting layer in the same manner as in Example 20, thus a photoconductor was produced.

The electrophotographic characteristics of the photoconductors thus produced were measured in the same manner as in Examples 1 to 5 by utilizing an electrostatic recording paper testing apparatus Model SP-428. The result obtained are shown in Table 7.

TABLE 7

|  | $V_s$ (volt) | $V_r$ (volt) | $E_{1/2}$ (lux · sec) |
|---|---|---|---|
| Example 19 | 710 | 50 | 4.1 |
| Example 20 | 620 | 60 | 5.3 |
| Example 21 | 710 | 30 | 3.8 |
| Example 22 | 660 | 50 | 4.7 |
| Example 23 | 660 | 50 | 5.1 |

As can be seen in Table 7, the photoconductors of Examples 19 to 23 have good characteristics in the half decay exposure amounts $E_{\frac{1}{2}}$ and the residual potentials $V_r$.

EXAMPLE 24

100 parts by weight of each of respective bisazo compounds Nos. from 123 to 165 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer having a thickness of about 15 μm, thus photoconductors were produced.

The electrophotographic characteristics of the photoconductors thus produced were measured in the same manner as in Example 6 by utilizing an electrostatic recording paper testing apparatus SP-428. The results of the measurements are shown in Table 8.

As can be seen in Table 8, the photoconductors using the bisazo compound Nos. 123 to 165 as a charge generating substance have good characteristics in the half decay exposure amount $E_{\frac{1}{2}}$.

TABLE 8

| Compound No. | $E_{1/2}$ (lux · sec) |
|---|---|
| 123 | 4.7 |
| 124 | 4.6 |
| 125 | 4.5 |
| 126 | 5.4 |
| 127 | 4.2 |
| 128 | 4.3 |
| 129 | 5.8 |
| 130 | 6.0 |
| 131 | 4.7 |
| 132 | 5.5 |
| 133 | 4.5 |
| 134 | 6.7 |
| 135 | 5.2 |
| 136 | 5.0 |
| 137 | 4.8 |
| 138 | 4.3 |
| 139 | 5.2 |
| 140 | 4.0 |
| 141 | 4.5 |
| 142 | 5.7 |
| 143 | 6.0 |
| 144 | 4.3 |
| 145 | 5.7 |
| 146 | 5.6 |
| 147 | 5.3 |
| 148 | 4.7 |
| 149 | 4.1 |
| 150 | 4.6 |
| 151 | 4.0 |
| 152 | 6.7 |
| 153 | 6.2 |
| 154 | 5.7 |
| 155 | 5.1 |
| 156 | 7.2 |
| 157 | 4.9 |
| 158 | 4.8 |
| 159 | 5.4 |
| 160 | 5.7 |
| 161 | 4.2 |
| 162 | 4.7 |
| 163 | 5.8 |
| 164 | 5.4 |
| 165 | 6.0 |

EXAMPLE 25

A photoconductor was produced in the same manner as in Example 1 except that compound No. 171 was used to replace compound No. 1 as a charge generating substance.

EXAMPLE 26

A photoconductor was produced in the same manner as in Example 2 except that compound No. 172 was used to replace compound No. 2 as a charge generating substance.

EXAMPLE 27

A charge transporting layer was formed in substantially the same manner as in Example 26 except that α-phenyl-4'-N,N-dimethylaminostilbene was used to replace ABPH as a charge transporting substance. Then a charge generating layer was formed on the charge transporting layer in the same manner as in Example 26, thus a photoconductor was produced.

EXAMPLE 28

A charge transporting layer was formed in substantially the same manner as in Example 26 except that tri(p-tolyl)amine was used to replace ABPH as a charge transporting substance. Then a charge generating layer was formed on the charge transporting layer in the same manner as in Example 26, thus a photoconductor was produced.

EXAMPLE 29

A charge transporting layer was formed in substantially the same manner as in Example 26 except that 2,5-bis(p-diethylaminophenyl)-1,3,4-oxadiazole was used to replace ABPH as a charge transporting substance. Then a charge generating layer was formed on the charge transporting layer in the same manner as in Example 26, thus a photoconductor was produced.

The electrophotographic characteristics of the photoconductors thus produced were measured in the same manner as in Examples 1 to 5 by utilizing an electrostatic recording paper testing apparatus Model SP-428. The result obtained are shown in Table 9.

TABLE 9

|  | $V_s$ (volt) | $V_r$ (volt) | $E_{1/2}$ (lux · sec) |
| --- | --- | --- | --- |
| Example 25 | 660 | 80 | 5.1 |
| Example 26 | 620 | 80 | 5.3 |
| Example 27 | 620 | 60 | 5.5 |
| Example 28 | 640 | 40 | 4.8 |
| Example 29 | 650 | 50 | 4.6 |

As can be seen in Table 9, the photoconductors of Examples 25 to 29 have good characteristics in the half decay exposure amounts $E_{\frac{1}{2}}$ and the residual potentials $V_r$.

EXAMPLE 30

100 parts by weight of each of respective bisazo compounds Nos. from 173 to 214 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer having a thickness of about 15 μm, thus photoconductors were produced.

The electrophotographic characteristics of the photoconductors thus produced were measured in the same manner as in Example 6 by utilizing an electrostatic recording paper testing apparatus SP-428. The results of the measurements are shown in Table 10.

As can be seen in Table 10, the photoconductors using the bisazo compound Nos. 173 to 214 as a charge generating substance have good characteristics in the half decay exposure amount $E_{\frac{1}{2}}$.

TABLE 10

| Compound No. | $E_{1/2}$ (lux · sec) |
| --- | --- |
| 173 | 4.3 |
| 174 | 4.1 |
| 175 | 4.9 |
| 176 | 5.0 |
| 177 | 5.6 |
| 178 | 5.3 |
| 179 | 5.2 |
| 180 | 6.1 |
| 181 | 5.4 |
| 182 | 4.7 |
| 183 | 5.4 |
| 184 | 6.1 |
| 185 | 5.9 |
| 186 | 5.6 |
| 187 | 5.0 |
| 188 | 5.6 |
| 189 | 5.1 |
| 190 | 4.9 |
| 191 | 5.7 |
| 192 | 4.6 |
| 193 | 4.2 |
| 194 | 5.1 |
| 195 | 6.3 |
| 196 | 4.6 |
| 197 | 4.7 |
| 198 | 3.8 |
| 199 | 5.2 |
| 200 | 3.6 |
| 201 | 5.4 |
| 202 | 5.2 |
| 203 | 4.8 |
| 204 | 5.0 |
| 205 | 4.6 |
| 206 | 4.3 |
| 207 | 6.1 |
| 208 | 5.7 |
| 209 | 5.0 |
| 210 | 5.6 |
| 211 | 4.8 |
| 212 | 4.0 |
| 213 | 4.8 |
| 214 | 4.7 |

EXAMPLE 31

A photoconductor was produced in the same manner as in Example 1 except that compound No. 221 was used to replace compound No. 1 as a charge generating substance.

EXAMPLE 32

A photoconductor was produced in the same manner as in Example 2 except that compound No. 222 was used to replace compound No. 2 as a charge generating substance.

EXAMPLE 33

A charge transporting layer was formed in substantially the same manner as in Example 32 except that α-phenyl-4'-N,N-dimethylaminostilbene was used to replace ABPH as a charge transporting substance. Then a charge generating layer was formed on the charge transporting layer in the same manner as in Example 32, thus a photoconductor was produced.

EXAMPLE 34

A charge transporting layer was formed in substantially the same manner as in Example 32 except that tri(p-tolyl)amine was used to replace ABPH as a charge transporting substance. Then a charge generating layer was formed on the charge transporting layer in the same manner as in Example 32, thus a photoconductor was produced.

EXAMPLE 35

A charge transporting layer was formed in substantially the same manner as in Example 32 except that 2,5-bis(p-diethylaminophenyl)-1,3,4-oxadiazole was used to replace ABPH as a charge transporting substance. Then a charge generating layer was formed on the charge transporting layer in the same manner as in Example 32, thus a photoconductor was produced.

The electrophotographic characteristics of the photoconductors thus produced were measured in the same manner as in Examples 1 to 5 by utilizing an electrostatic recording paper testing apparatus Model SP-428. The result obtained are shown in Table 11.

TABLE 11

|  | $V_s$ (volt) | $V_r$ (volt) | $E_{1/2}$ (lux · sec) |
|---|---|---|---|
| Example 31 | 650 | 60 | 4.2 |
| Example 32 | 620 | 70 | 5.3 |
| Example 33 | 640 | 50 | 3.8 |
| Example 34 | 620 | 30 | 4.0 |
| Example 35 | 610 | 30 | 3.8 |

As can be seen in Table 11 the photoconductors of Examples 31 to 35 have good characteristics in the half decay exposure amounts $E_\frac{1}{2}$ and the residual potentials $V_r$.

EXAMPLE 36

100 parts by weight of each of respective bisazo compounds Nos. from 223 to 264 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer having a thickness of about 15 μm, thus photoconductors were produced.

The electrophotographic characteristics of the photoconductors thus produced were measured in the same manner as in Example 6 by utilizing an electrostatic recording paper testing apparatus SP-428. The results of the measurements are shown in Table 12.

As can be seen in Table 12, the photoconductors using the bisazo compound Nos. 223 to 264 as a charge generating substance have good characteristics in the half decay exposure amount $E_\frac{1}{2}$.

TABLE 12

| Compound No. | $E_{1/2}$ (lux · sec) |
|---|---|
| 223 | 4.5 |
| 224 | 4.0 |
| 225 | 5.2 |
| 226 | 4.8 |
| 227 | 5.0 |
| 228 | 4.9 |
| 229 | 5.0 |
| 230 | 3.9 |
| 231 | 4.6 |
| 232 | 3.9 |
| 233 | 4.9 |
| 234 | 5.4 |
| 235 | 5.6 |
| 236 | 4.2 |
| 237 | 4.6 |
| 238 | 6.1 |
| 239 | 4.7 |
| 240 | 4.0 |
| 241 | 3.8 |
| 242 | 4.2 |
| 243 | 3.7 |
| 244 | 4.3 |
| 245 | 4.5 |
| 246 | 3.9 |
| 247 | 4.0 |
| 248 | 3.9 |
| 249 | 4.6 |
| 250 | 4.1 |
| 251 | 4.6 |
| 252 | 5.0 |
| 253 | 4.2 |
| 254 | 3.9 |
| 255 | 4.2 |

TABLE 12-continued

| Compound No. | $E_{1/2}$ (lux · sec) |
|---|---|
| 256 | 4.7 |
| 257 | 5.6 |
| 258 | 5.1 |
| 259 | 3.7 |
| 260 | 5.0 |
| 261 | 4.7 |
| 262 | 4.6 |
| 263 | 4.2 |
| 264 | 4.5 |

EXAMPLE 37

A photoconductor was produced in the same manner as in Example 1 except that compound No. 271 was used to replace compound No. 1 as a charge generating substance.

EXAMPLE 38

A photoconductor was produced in the same manner as in Example 2 except that compound No. 272 was used to replace compound No. 2 as a charge generating substance.

EXAMPLE 39

A charge transporting layer was formed in substantially the same manner as in Example 38 except that α-phenyl-4'-N,N-dimethylaminostilbene was used to replace ABPH as a charge transporting substance. Then a charge generating layer was formed on the charge transporting layer in the same manner as in Example 38, thus a photoconductor was produced.

EXAMPLE 40

A charge transporting layer was formed in substantially the same manner as in Example 38 except that tri(p-tolyl)amine was used to replace ABPH as a charge transporting substance. Then a charge generating layer was formed on the charge transporting layer in the same manner as in Example 38, thus a photoconductor was produced.

EXAMPLE 41

A charge transporting layer was formed in substantially the same manner as in Example 38 except that 2,5-bis(p-diethylaminophenyl)-1,3,4-oxadiazole was used to replace ABPH as a charge transporting substance. Then a charge generating layer was formed on the charge transporting layer in the same manner as in Example 38, thus a photoconductor was produced.

The electrophotographic characteristics of the photoconductors thus produced were measured in the same manner as in Examples 1 to 5 by utilizing an electrostatic recording paper testing apparatus Model SP-428. The result obtained are shown in Table 13.

TABLE 13

|  | $V_s$ (volt) | $V_r$ (volt) | $E_{1/2}$ (lux · sec) |
|---|---|---|---|
| Example 37 | 660 | 20 | 4.9 |
| Example 38 | 630 | 50 | 5.1 |
| Example 39 | 620 | 80 | 5.3 |
| Example 40 | 630 | 60 | 4.1 |
| Example 41 | 650 | 50 | 4.3 |

As can be seen in Table 13, the photoconductors of Examples 37 to 41 have good characteristics in the half decay exposure amounts $E_{\frac{1}{2}}$ and the residual potentials $V_r$.

EXAMPLE 42

100 parts by weight of each of respective bisazo compounds Nos. from 273 to 314 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer having a thickness of about 15 μm, thus photoconductors were produced.

The electrophotographic characteristics of the photoconductors thus produced were measured in the same manner as in Example 6 by utilizing an electrostatic recording paper testing apparatus SP-428. The results of the measurements are shown in Table 14.

As can be seen in Table 14, the photoconductors using the bisazo compound Nos. 273 to 314 as a charge generating substance have good characteristics in the half decay exposure amount $E_{\frac{1}{2}}$.

TABLE 14

| Compound No. | $E_{1/2}$ (lux · sec) |
|---|---|
| 273 | 5.2 |
| 274 | 3.8 |
| 275 | 4.6 |
| 276 | 5.3 |
| 277 | 6.1 |
| 278 | 4.7 |
| 279 | 4.4 |
| 280 | 4.9 |
| 281 | 5.4 |
| 282 | 5.9 |
| 283 | 5.5 |
| 284 | 4.7 |
| 285 | 6.3 |
| 286 | 4.1 |
| 287 | 4.0 |
| 288 | 3.8 |
| 289 | 4.7 |
| 290 | 4.4 |
| 291 | 5.3 |
| 292 | 4.2 |
| 293 | 5.8 |
| 294 | 6.7 |
| 295 | 4.9 |
| 296 | 5.5 |
| 297 | 4.7 |
| 298 | 4.4 |
| 299 | 4.9 |
| 300 | 3.6 |
| 301 | 4.5 |
| 302 | 4.7 |
| 303 | 6.1 |
| 304 | 5.8 |
| 305 | 4.8 |
| 306 | 4.0 |
| 307 | 5.1 |
| 308 | 5.7 |
| 309 | 5.5 |
| 310 | 5.6 |
| 311 | 4.7 |
| 312 | 4.1 |
| 313 | 4.0 |
| 314 | 4.2 |

EXAMPLE 43

A photoconductor was produced in the same manner as in Example 1 except that compound No. 321 was used to replace compound No. 1 as a charge generating substance.

EXAMPLE 44

A photoconductor was produced in the same manner as in Example 2 except that compound No. 322 was used to replace compound No. 2 as a charge generating substance.

EXAMPLE 45

A charge transporting layer was formed in substantially the same manner as in Example 44 except that α-phenyl-4'-N,N-dimethylaminostilbene was used to replace ABPH as a charge transporting substance. Then a charge generating layer was formed on the charge transporting layer in the same manner as in Example 44, thus a photoconductor was produced.

EXAMPLE 46

A charge transporting layer was formed in substantially the same manner as in Example 44 except that tri(p-tolyl)amine was used to replace ABPH as a charge transporting substance. Then a charge generating layer was formed on the charge transporting layer in the same manner as in Example 44, thus a photoconductor was produced.

EXAMPLE 47

A charge transporting layer was formed in substantially the same manner as in Example 44 except that 2,5-bis(p-diethylaminophenyl)-1,3,4-oxadiazole was used to replace ABPH as a charge transporting substance. Then a charge generating layer was formed on the charge transporting layer in the same manner as in Example 44, thus a photoconductor was produced.

The electrophotographic characteristics of the photoconductors thus produced were measured in the same manner as in Examples 1 to 5 by utilizing an electrostatic recording paper testing apparatus Model SP-428. The result obtained are shown in Table 15.

TABLE 15

|  | $V_s$ (volt) | $V_r$ (volt) | $E_{1/2}$ (lux · sec) |
|---|---|---|---|
| Example 43 | 620 | 50 | 4.3 |
| Example 44 | 590 | 20 | 4.8 |
| Example 45 | 660 | 60 | 5.1 |
| Example 46 | 630 | 60 | 5.3 |
| Example 47 | 600 | 40 | 4.7 |

As can be seen in Table 15, the photoconductors of Examples 43 to 47 have good characteristics in the half decay exposure amounts $E_{\frac{1}{2}}$ and the residual potentials $V_r$.

EXAMPLE 48

100 parts by weight of each of respective bisazo compounds Nos. from 323 to 386 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid of ABPH prepared in substantially the same manner as in Example 2 was applied on the respective charge generating layer having a thickness of about 15 μm, thus photoconductors were produced.

The electrophotographic characteristics of the photoconductors thus produced were measured in the same manner as in Example 6 by utilizing an electrostatic recording paper testing apparatus SP-428. The results of the measurements are shown in Table 16.

As can be seen in Table 16, the photoconductors using the bisazo compound Nos. 323 to 386 as a charge generating substance have good characteristics in the half decay exposure amount $E_{\frac{1}{2}}$.

TABLE 16

| Compound No. | $E_{1/2}$ (lux · sec) |
|---|---|
| 323 | 4.0 |
| 324 | 4.9 |
| 325 | 4.7 |
| 326 | 4.0 |
| 327 | 4.4 |
| 328 | 4.8 |
| 329 | 5.3 |
| 330 | 6.1 |
| 331 | 5.8 |
| 332 | 4.3 |
| 333 | 5.2 |
| 334 | 4.5 |
| 335 | 5.1 |
| 336 | 5.3 |
| 337 | 6.2 |
| 338 | 4.8 |
| 339 | 5.3 |
| 340 | 4.7 |
| 341 | 4.3 |
| 342 | 6.0 |
| 343 | 6.2 |
| 344 | 5.5 |
| 345 | 4.6 |
| 346 | 4.7 |
| 347 | 5.6 |
| 348 | 4.5 |
| 349 | 4.2 |
| 350 | 4.7 |
| 351 | 5.1 |
| 352 | 5.2 |

TABLE 8

| Compound No. | $E_{1/2}$ (lux · sec) |
|---|---|
| 353 | 4.7 |
| 354 | 4.6 |
| 355 | 4.7 |
| 356 | 6.0 |
| 357 | 5.8 |
| 358 | 4.1 |
| 359 | 3.7 |
| 360 | 4.0 |
| 361 | 4.9 |
| 362 | 6.9 |
| 363 | 4.7 |
| 364 | 4.1 |
| 365 | 5.8 |
| 366 | 4.7 |
| 367 | 5.2 |
| 368 | 5.7 |
| 369 | 4.2 |
| 370 | 4.9 |
| 371 | 5.8 |
| 372 | 4.4 |
| 373 | 5.1 |
| 374 | 5.9 |
| 375 | 4.6 |
| 376 | 4.7 |
| 377 | 3.5 |
| 378 | 5.9 |
| 379 | 6.0 |
| 380 | 4.8 |
| 381 | 4.1 |
| 382 | 6.4 |
| 383 | 5.8 |
| 384 | 4.4 |

TABLE 8-continued

| Compound No. | $E_{1/2}$ (lux · sec) |
|---|---|
| 385 | 4.8 |
| 386 | 4.6 |

As described above, according to the present invention, since a bisazo compound represented by any one of the aforementioned chemical formulae is used as a charge generating substance in a photosensitive layer formed on an electroconductive substrate, a photoconductor shows a high sensitive and excellent characteristics in repeated use when adapted to either a positive charge mode or a negative charge mode. If necessary, a covering layer may be provided on the surface of a photoconductor to improve the durability thereof.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A photoconductor for electrophotography, comprising:
   an electroconductive substrate; and
   a photosensitive layer formed on said electroconductive substrate and including a charge transporting substance and a charge generating substance which is at least one bisazo compound represented by general formula (III):

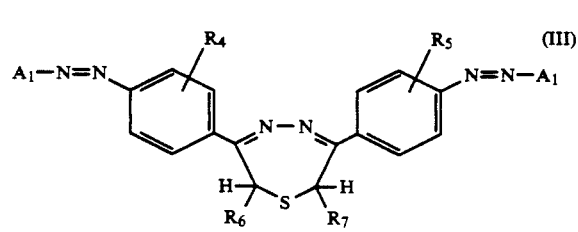

wherein each of $R_4$ and $R_5$ is selected from the group consisting of a hydrogen atom, a halogen atom, an alkyl group and an alkoxy group, which groups may be substituted, each of $R_6$ and $R_7$ is selected from the group consisting of a hydrogen atom, an alkyl group and an aryl group, which groups may be substituted, and $A_1$ is a coupler residual group represented by one of general formulae (X) to (XVII):

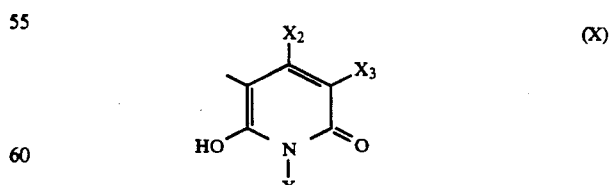

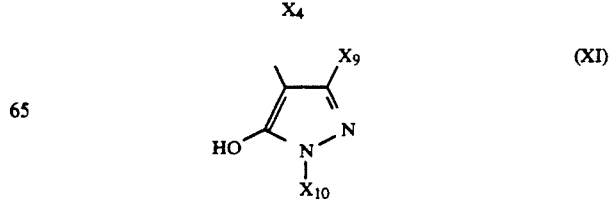

-continued

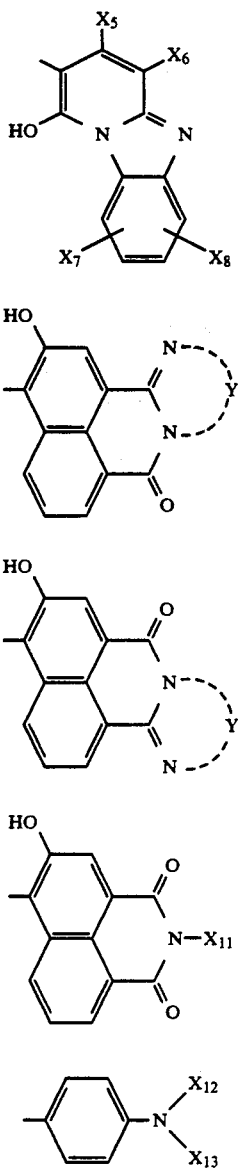

(XII)

(XIII)

(XIV)

(XV)

(XVI)

-continued

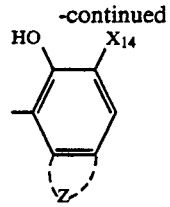

(XVII)

wherein Z is a residual group which condenses with a benzene ring to form an aromatic polycycle or heterocycle, $X_{14}$ is one of a hydrogen atom, $COOR_1$ and $CONR_2R_3$, where each of $R_1$, $R_2$ and $R_3$ is selected from the group consisting of a hydrogen atom, an alkyl group, an aryl group and a heterocyclic group, which groups may substituted, each of $X_2$ and $X_5$ is selected from the group consisting of an alkyl group, an aryl group and a heterocyclic group which groups may be substituted, each of $X_3$ and $X_6$ is selected from the group consisting of a hydrogen atom, a cyano group, a carbamoyl group, a carboxyl group, an ester group and an acyl group, each of $X_4$, $X_{11}$, $X_{12}$ and $X_{13}$ is selected from the group consisting of a hydrogen atom, an alkyl group, a cycloalkyl group, an alkenyl group, an aralkyl group, an aryl group and a heterocyclic group, each of $X_7$ and $X_8$ is selected from the group consisting of a hydrogen atom, a halogen atom, a nitro group, an alkyl group and an alkoxy group, the alkyl group and the alkoxy group of which may be substituted, $X_9$ is selected from the group consisting of an alkyl group, an aryl group, a carboxyl group and an ester group, $X_{10}$ is one of an aryl group and a heterocyclic group, which groups may be substituted, and Y is a residual group which forms an aromatic ring or a heterocycle.

2. The photoconductor as claimed in claim 1, wherein said photosensitive layer comprises a layer including a binder in which is dispersed the charge generating substance and the charge transporting substance.

3. The photoconductor as claimed in claim 1, wherein said photosensitive layer comprises a laminate of a charge transporting layer mainly composed of the charge transporting substance and a binder, and a charge generating layer including the charge generating substance and a binder.

* * * * *